United States Patent
Yoshizawa

(10) Patent No.: US 11,039,337 B2
(45) Date of Patent: Jun. 15, 2021

(54) APPARATUS AND METHOD

(71) Applicant: SONY CORPORATION, Tokyo (JP)

(72) Inventor: Atsushi Yoshizawa, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 189 days.

(21) Appl. No.: 16/068,283

(22) PCT Filed: Jan. 19, 2017

(86) PCT No.: PCT/JP2017/001620
§ 371 (c)(1),
(2) Date: Jul. 5, 2018

(87) PCT Pub. No.: WO2017/145586
PCT Pub. Date: Aug. 31, 2017

(65) Prior Publication Data
US 2019/0021024 A1    Jan. 17, 2019

(30) Foreign Application Priority Data

Feb. 22, 2016   (JP) .............................. JP2016-030616

(51) Int. Cl.
*H04W 28/06*   (2009.01)
*H04W 28/02*   (2009.01)
(Continued)

(52) U.S. Cl.
CPC ........... *H04W 28/06* (2013.01); *H04L 1/1829* (2013.01); *H04L 1/1854* (2013.01);
(Continued)

(58) Field of Classification Search
CPC ... H04L 1/1829; H04L 1/1854; H04L 1/1867; H04L 1/1887; H04L 27/2602;
(Continued)

(56) References Cited

U.S. PATENT DOCUMENTS 10,321,455 B2 *   6/2019   Kuchibhotla ......... H04L 5/0055
10,348,523 B2 *   7/2019   Kim .................... H04L 27/2675
(Continued)

FOREIGN PATENT DOCUMENTS

EP          3229544 A1      10/2017
EP          3425979 A1       1/2019
(Continued)

OTHER PUBLICATIONS

Extended European Search Report dated Feb. 1, 2019, issued in corresponding EP Application No. 17756028.1, 13 pages.
(Continued)

*Primary Examiner* — Ahmed Elallam
(74) *Attorney, Agent, or Firm* — Xsensus LLP

(57) ABSTRACT

[Object] To set a minimum unit of a transmission time in communication via wireless communication in a further preferred form in accordance with conditions.
[Solution] An apparatus including: a communication unit that performs wireless communication; and a control unit that decides a minimum unit of a transmission time in communication via the wireless communication on a basis of a first processing time that is decided in accordance with a terminal apparatus and a second processing time that is decided in accordance with a communication environment.

19 Claims, 14 Drawing Sheets

(51) Int. Cl.
*H04W 72/04* (2009.01)
*H04W 76/27* (2018.01)
*H04W 88/08* (2009.01)
*H04W 56/00* (2009.01)
*H04L 1/18* (2006.01)

(52) U.S. Cl.
CPC .......... *H04L 1/1867* (2013.01); *H04L 1/1887* (2013.01); *H04W 28/0278* (2013.01); *H04W 56/00* (2013.01); *H04W 72/04* (2013.01); *H04W 72/0446* (2013.01); *H04W 76/27* (2018.02); *H04W 88/085* (2013.01)

(58) Field of Classification Search
CPC . H04W 28/0278; H04W 28/06; H04W 56/00; H04W 72/04; H04W 72/0446; H04W 76/27; H04W 88/085; H04W 56/0045
See application file for complete search history.

(56) References Cited

U.S. PATENT DOCUMENTS

| | | | | |
|---|---|---|---|---|
| 10,432,386 | B2* | 10/2019 | Chen | H04L 27/2613 |
| 10,455,600 | B2* | 10/2019 | Lee | H04W 72/042 |
| 10,455,610 | B2* | 10/2019 | Sun | H04L 5/00 |
| 10,547,415 | B2* | 1/2020 | Jiang | H04L 1/1812 |
| 10,602,431 | B2* | 3/2020 | Takeda | H04W 48/10 |
| 10,667,290 | B2* | 5/2020 | Arshad | H04W 56/0045 |
| 10,721,772 | B2* | 7/2020 | Xiong | H04W 74/006 |
| 2009/0181689 | A1 | 7/2009 | Lee et al. | |
| 2010/0220693 | A1 | 9/2010 | Ho | |
| 2015/0043461 | A1 | 2/2015 | Sachs et al. | |
| 2015/0264683 | A1 | 9/2015 | Kim et al. | |
| 2017/0111160 | A1* | 4/2017 | Chen | H04W 72/042 |
| 2017/0135077 | A1* | 5/2017 | Meng | H04L 5/001 |
| 2017/0223695 | A1* | 8/2017 | Kwak | H04W 56/0075 |
| 2017/0290008 | A1* | 10/2017 | Tooher | H04L 1/1893 |
| 2018/0041325 | A1* | 2/2018 | Lee | H04L 5/001 |
| 2018/0098337 | A1* | 4/2018 | Lee | H04W 72/042 |
| 2018/0176934 | A1* | 6/2018 | Uchino | H04W 72/085 |
| 2018/0255550 | A1* | 9/2018 | Takeda | H04L 5/0094 |
| 2018/0331816 | A1* | 11/2018 | Harada | H04L 5/22 |
| 2018/0332605 | A1* | 11/2018 | Pelletier | H04W 72/1289 |
| 2019/0320459 | A1* | 10/2019 | Sun | H04L 1/1887 |

FOREIGN PATENT DOCUMENTS

| | | |
|---|---|---|
| JP | 2015-508265 A | 3/2015 |
| JP | 2018-537024 | 12/2018 |
| WO | 2017/069848 A1 | 4/2017 |
| WO | 2018/101880 A1 | 6/2018 |

OTHER PUBLICATIONS

International Search Report dated Apr. 18, 2017 in PCT/JP2017/001620, 1 page.

"Considerations of FDD DL HARQ for Supporting Latency Reduction", Nokia Networks, Alcatel-Lucent, Alcatel-Lucent Shanghai Bell, 3GPP TSG-RAN WG1 Meeting #84, R1-160798, Feb. 2016, pp. 1-5.

"New SI Proposal: Study on Latency reduction techniques for LTE", Ericsson, Huawei, 3GPP TSG RAN Meeting #67, RP-150465, Mar. 2015, pp. 1-7.

Office Action dated Feb. 4, 2020 in Japanese Patent Application No. 2016-030616, 12 pages.

* cited by examiner

APPARATUS AND METHOD

TECHNICAL FIELD

The present disclosure relates to an apparatus, and a method.

BACKGROUND ART

In discussions on the development of mobile communication systems, improvement in throughput in communication between base stations and terminal apparatuses has always been a big issue. In particular, further improvement in throughput has been desired with an accelerated increase in data communication fees in recent years.

Meanwhile, improvement in throughput by shortening a minimum unit of a transmission time (transmission time interval: TTI) to reduce a delay in the communication has continuously been attempted. In a specific example, the TTI is 10 ms in a third generation wideband code division multiple access (WCDMA is a registered trademark), is shortened to 2 ms in 3.5-th generation high-speed downlink packet access (HSDPA), and is shortened to 1 ms in fourth generation Long Term Evolution (LTE).

In addition, studies regarding fifth generation (5G) mobile communication systems following LTE/LTE-A (advanced) have advanced in recent years. For example, further shortening of the TTI to less than 1 ms corresponding to the conventional sub-frame length has been studied in Non-Patent Literature 1 in order to further reduce the delay. In particular, low-delay communication realized by shortening the TTI has been required by applications that require real time properties, such as network participation-type games and so-called vehicular-to-X (something) (V2X) communication in particular.

CITATION LIST

Non-Patent Literature

Non-Patent Literature 1: RP-150465: "New SI proposal: Study on Latency reduction techniques for LTE," in 3GPP TSG RAN #67, Shanghai, China, March, 2015

DISCLOSURE OF INVENTION

Technical Problem

Meanwhile, a processing time, (hereinafter, also referred to as a "terminal processing time") for the terminal apparatus to execute various kinds of processing from reception of data transmitted from a base station to transmission of data to the base station tends to be shorter as the TTI becomes shorter. In contrast, there are cases in which a terminal processing time required by each terminal apparatus differs in accordance with an environment of communication between the terminal apparatus and the base station, performance of the terminal apparatus, and the like. Therefore, a case in which it is difficult to sufficiently secure the terminal processing time is assumed due to the shortening of the TTI depending on conditions.

Thus, the present disclosure proposes an apparatus and a method capable of setting a minimum unit of a transmission time in communication via wireless communication in a further preferred form in accordance with conditions.

Solution to Problem

According to the present disclosure, there is provided an apparatus including: a communication unit that performs wireless communication; and a control unit that decides a minimum unit of a transmission time in communication via the wireless communication on a basis of a first processing time that is decided in accordance with a terminal apparatus and a second processing time that is decided in accordance with a communication environment.

In addition, according to the present disclosure, there is provided an apparatus including: a communication unit that performs wireless communication; and a control unit that performs control such that information indicating a first processing time that is decided in accordance with a terminal apparatus for deciding a minimum time of a transmission time in communication via the wireless communication is transmitted to a base station via the wireless communication.

In addition, according to the present disclosure, there is provided a method including: performing wireless communication; and deciding, by a processor, a minimum unit of a transmission time on a basis of a first processing time that is decided in accordance with a terminal apparatus and a second processing time that is decided in accordance with a communication environment.

In addition, according to the present disclosure, there is provided a method including: performing wireless communication; and performing, by a processor, control such that information indicating a first processing time that is decided in accordance with a terminal apparatus for deciding a minimum unit of a transmission time in communication via the wireless communication is transmitted to a base station via the wireless communication.

Advantageous Effects of Invention

According to the present disclosure, an apparatus and a method capable of setting a minimum unit of a transmission time in communication via wireless communication in a preferred form in accordance with conditions as described above are provided.

Note that the effects described above are not necessarily limitative. With or in the place of the above effects, there may be achieved any one of the effects described in this specification or other effects that may be grasped from this specification.

MODE(S) FOR CARRYING OUT THE INVENTION

Figure 1:
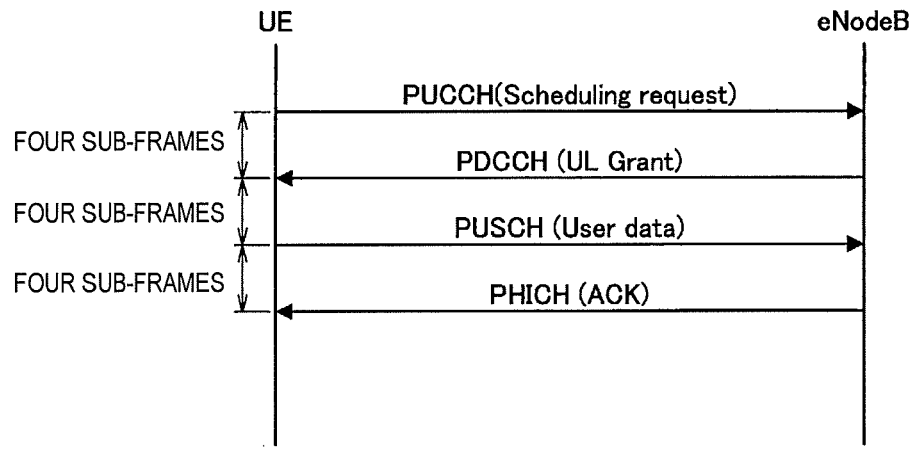
FIG. 1 is an explanatory diagram for describing an example of a data transmission timing in an uplink in LTE.

Hereinafter, (a) preferred embodiment(s) of the present disclosure will be described in detail with reference to the appended drawings. Note that, in this specification and the appended drawings, structural elements that have substantially the same function and structure are denoted with the same reference numerals, and repeated explanation of these structural elements is omitted.

Note that description will be given in the following order.
1. Introduction
1.1. Terminal processing time
1.2. Technical problems
2. Examples of configurations
2.1. Example of configuration of system
2.2. Example of configuration of base station
2.3. Example of configuration of terminal apparatus
3. Technical features
4. Application examples
4.1. Application examples regarding base station
4.2. Application examples regarding terminal apparatus
5. Conclusion

1. Introduction

1.1. Terminal Processing Time

First, a relationship between a minimum unit of a transmission time (TTI) and a terminal processing time will be described by exemplifying a case in which frequency division duplex (FDD) is employed in LTE.

For example, FIG. 1 is an explanatory diagram for describing an example of a data transmission timing in uplink in LTE and illustrates in an exemplary case in which FDD is employed. As illustrated in FIG. 1, a terminal apparatus (UE) performs data transmission in the uplink 4*TTI (four sub-frames) after detection of reception of uplink grant (UL Grant) from a base station (eNodeB) in a case in which FDD is employed in LTE.

Figure 2:
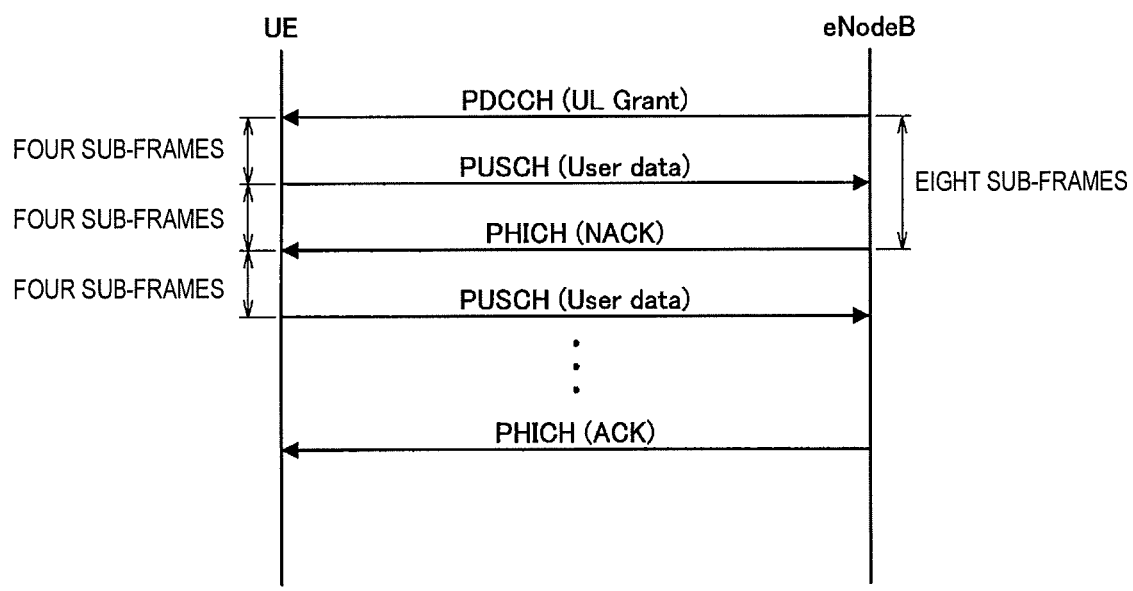
FIG. 2 is an explanatory diagram for describing an example of a synchronized HARQ timing in the uplink in LTE.

In addition, FIG. 2 is an explanatory diagram for describing an example of a synchronized hybrid automatic repeat request (HARQ) timing in the uplink in LTE and illustrates an exemplary case in which FDD is employed. In a case in which FDD is employed in LTE, transmission of various kinds of data from the base station to the terminal apparatus is performed every 8*TTI (eight sub-frames) in the synchronized HARQ in uplink transmission as illustrated in FIG. 2. At this time, in a case in which the terminal apparatus detects the uplink grant (UL Grant) or in a case in which the terminal apparatus detects ACK/NACK via PHICH, the terminal apparatus performs data transmission in the uplink 4*TTI (four sub-frames) later in a manner similar to the example described with reference to FIG. 1.

Here, a processing time (that is, a terminal processing time) during which the terminal apparatus is assigned to decoding of received data and generation of transmission data is generally considered to be a time from completion of data reception to start of data transmission. Therefore, in a case in which the data transmission is performed 4*TTI after the terminal apparatus receives data from the base station as described above, for example, the terminal processing time is ideally 3*TTI.

However, the terminal processing time is actually shorter than 3*TTI due to an influence of a transmission delay time $T_{pd}$ occurring in accordance with the distance between the base station and the terminal apparatus. For example, FIG. 3 is an explanatory diagram for describing the terminal processing time and illustrates an example of a processing timing in a case in which the terminal apparatus (UE) transmits and receives data to and from the base station (eNodeB).

Figure 3:
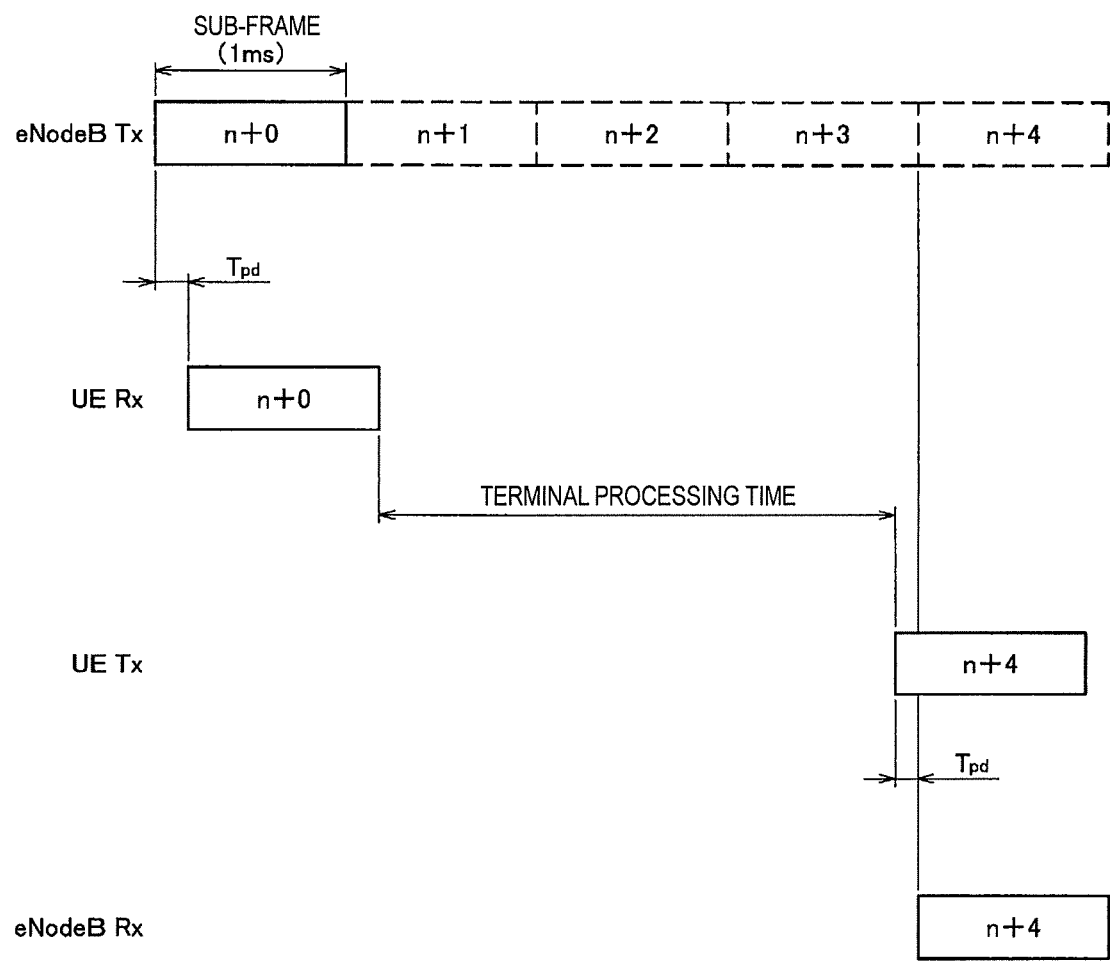
FIG. 3 is an explanatory diagram for describing a terminal processing time.

Specifically, FIG. 3 illustrates an exemplary case in which the terminal apparatus (UE) receives data that is transmitted at an n+0-th TTI (in other words, a sub-frame) from the base station (eNodeB). Data is transmitted to the base station 4*TTI after the reception of the data. In the example illustrated in FIG. 3, the terminal apparatus receives data (see Tx of eNodeB) transmitted from the base station a transmission delay time $T_{pd}$ after the transmission timing of the data (see Rx of UE). In addition, the terminal apparatus transmits the data at a timing earlier than the n+4-th TTI by the transmission delay time $T_{pd}$ such that the data transmitted by the terminal apparatus itself is received by the base station (see Rx of eNodeB) in the n+4-th TTI (sub-frame) 4*TTI after the base station transmits the data to the terminal apparatus (see Tx of UE). That is, in the example illustrated in FIG. 3, the terminal processing time is 3*TTI−2$T_{pd}$.

Note that twice the transmission delay time $T_{pd}$ illustrated in FIG. 3 corresponds to a timing advance value $T_{ADV}$ provided in a notification from the base station to the terminal apparatus. Therefore, if the terminal processing time is represented by using the timing advance value $T_{ADV}$ instead of the transmission delay time $T_{pd}$, the terminal processing time is 3*TTI−$T_{ADV}$ in the case of the example illustrated in FIG. 3.

1.2. Technical Problems

Next, technical problems according to the embodiment of the present disclosure will be described.

As described above, TTI in LTE is 1 ms (1 sub-frame). Therefore, 3*TTI corresponds to 3 ms in a case in which attention is paid to the example illustrated in FIG. 3, and this value is a sufficiently large value relative to the maximum timing advance value $T_{ADV}$ (667 µs in the case of a cell with a radius of 100 km) that is assumed in LTE. In a more specific example, the timing advance value $T_{ADV}$ is about 200 µs if it is assumed that the distance between the base station and the terminal apparatus is 30 km in the example illustrated in FIG. 3. In this case, the timing advance value $T_{ADV}$ (that is, 200 μs) represents a time ratio of about 7% relative to 3*TTI (that is, 3 ms). Therefore, it is possible for the terminal apparatus to sufficiently perform processing to be performed, such as decoding of received data and generation of transmission data, even if the terminal apparatus uses a remaining time (that is, 3*TTI–$T_{ADV}$) as the terminal processing time.

Meanwhile, further shortening of TTI as compared with 1 ms that corresponds to the conventional sub-frame length has been considered in LTE release 13 (LTE-ADVANCED PRO) in order to further reduce a delay. Such an improvement can also be an important technology for a so-called fifth generation (5G) mobile communication system. TTIs with TTI lengths of 7 symbols, 4 symbols, 3 symbols, 2 symbols, and 1 symbol have been considered as candidates of the shortened TTI (also referred to as "short TTI (sTTI)" in the description). Note that the simple description "symbol" in the description is assumed to represent an OFDM symbol, and for example, seven symbols correspond to one slot. In general, it is possible to expect an improvement in throughput in TCP traffic that performs so-called slow start, for example, by further shortening the TTI length. In particular, low-delay communication that is realized by shortening the TTI is required by functions (applications or the like) that require real time properties, in particular, such as network participation-type games and so-called vehicular-to-X (something) (V2X) communication. Therefore, it is desirable that the TTI length of the sTTI be able to be shortened to one symbol.

Meanwhile, since the terminal processing time tends to be shorter as the TTI is shortened, there are cases in which problems that do not occur in conventional systems appear. Specifically, there is a possibility of the terminal processing time (for example, 3*sTTI) not becoming sufficiently large relative to the timing advance value $T_{ADV}$ due to employment of the sTTI with a further shortened TTI length.

Figure 4:
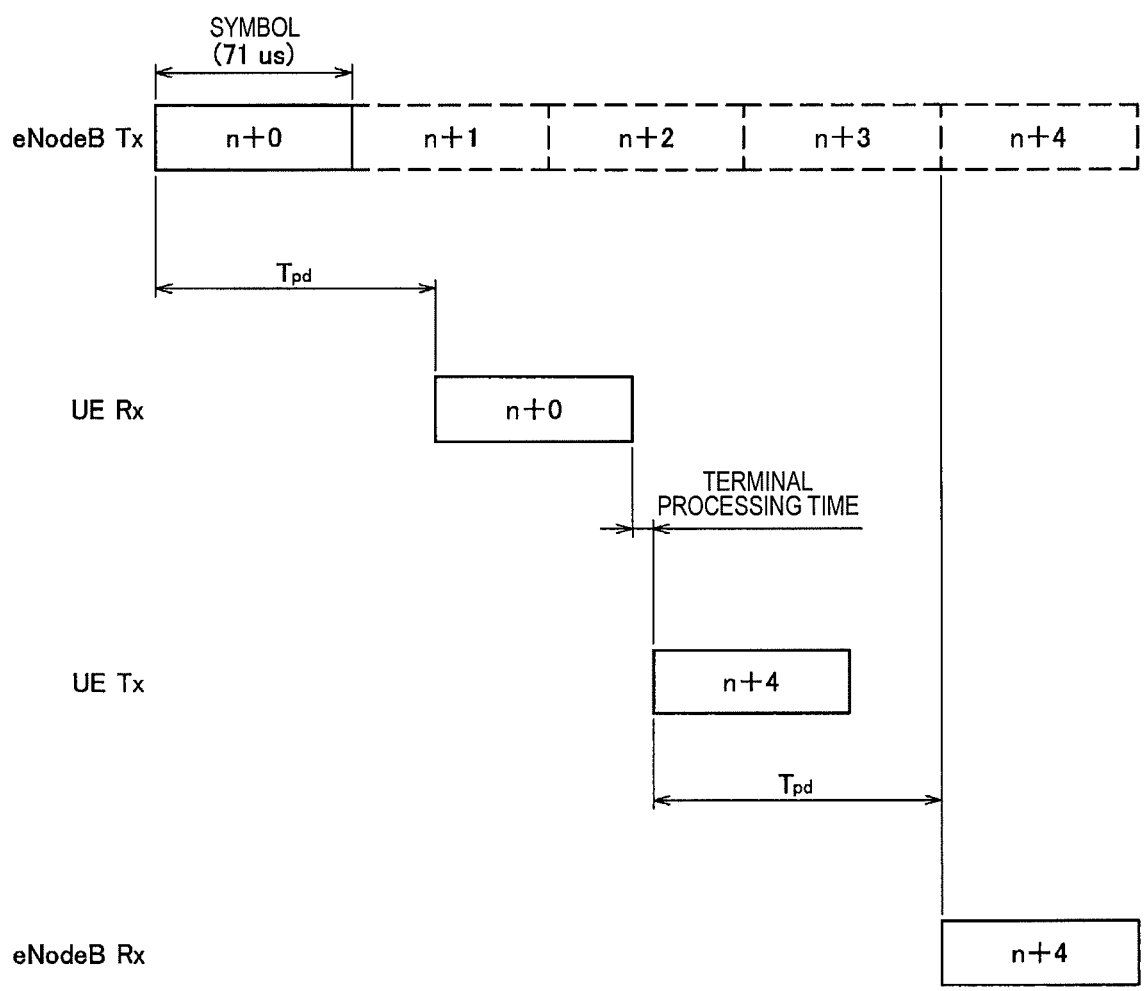
FIG. 4 is an explanatory diagram for describing a terminal processing time.

For example, FIG. 4 is an explanatory diagram for describing a terminal processing time and illustrates an exemplary case in which the TTI length of the sTTI is set to one symbol length as another example of the processing timing in a case in which the terminal apparatus (UE) transmits and receives data to and from the base station (eNodeB).

Specifically, since the one symbol length in LTE is about 71 μs, 3*sTTI corresponds to about 213 μs. In addition, in a case in which the distance between the base station and the terminal apparatus is assumed to be 30 km in a manner similar to that in the example in FIG. 3, the timing advance value $T_{ADV}$ is 200 μs. That is, in the example illustrated in FIG. 4, $T_{ADV}$ (200 μs) occupies the proportion of about 94% relative to 3*sTTI (213 μs), and the terminal processing time at this time is 13 μs. That is, it is necessary for the terminal apparatus to execute processing such as decoding of received data and generation of transmission data in a period of time that is as short as 13 μs in the exemplary case illustrated in FIG. 4. In particular, there are cases in which the processing time (that is, the terminal processing time) required by each terminal apparatus to execute various kinds of processing such as decoding of received data and generation of transmission data differs in accordance with performance of the terminal apparatus.

In addition, it is necessary to assume the cell radius of about 100 km at a maximum in the case of a macrocell for the LTE specification. Therefore, there are cases in which the timing advance value $T_{ADV}$ becomes longer than 3*sTTI in the terminal apparatus located at a cell edge under a condition in which the cell radius becomes larger than 30 km. Under such a condition, it is substantially difficult to secure the terminal processing time.

Thus, the present disclosure will propose an example of a mechanism capable of setting a minimum unit of a transmission time in wireless communication, such as the TTI or the aforementioned sTTI, in a more preferred form in accordance with conditions. Hereinafter, details of a system according to the embodiment will be described.

2. Example of Configuration 2.1. Example of Configuration of System

Figure 5:
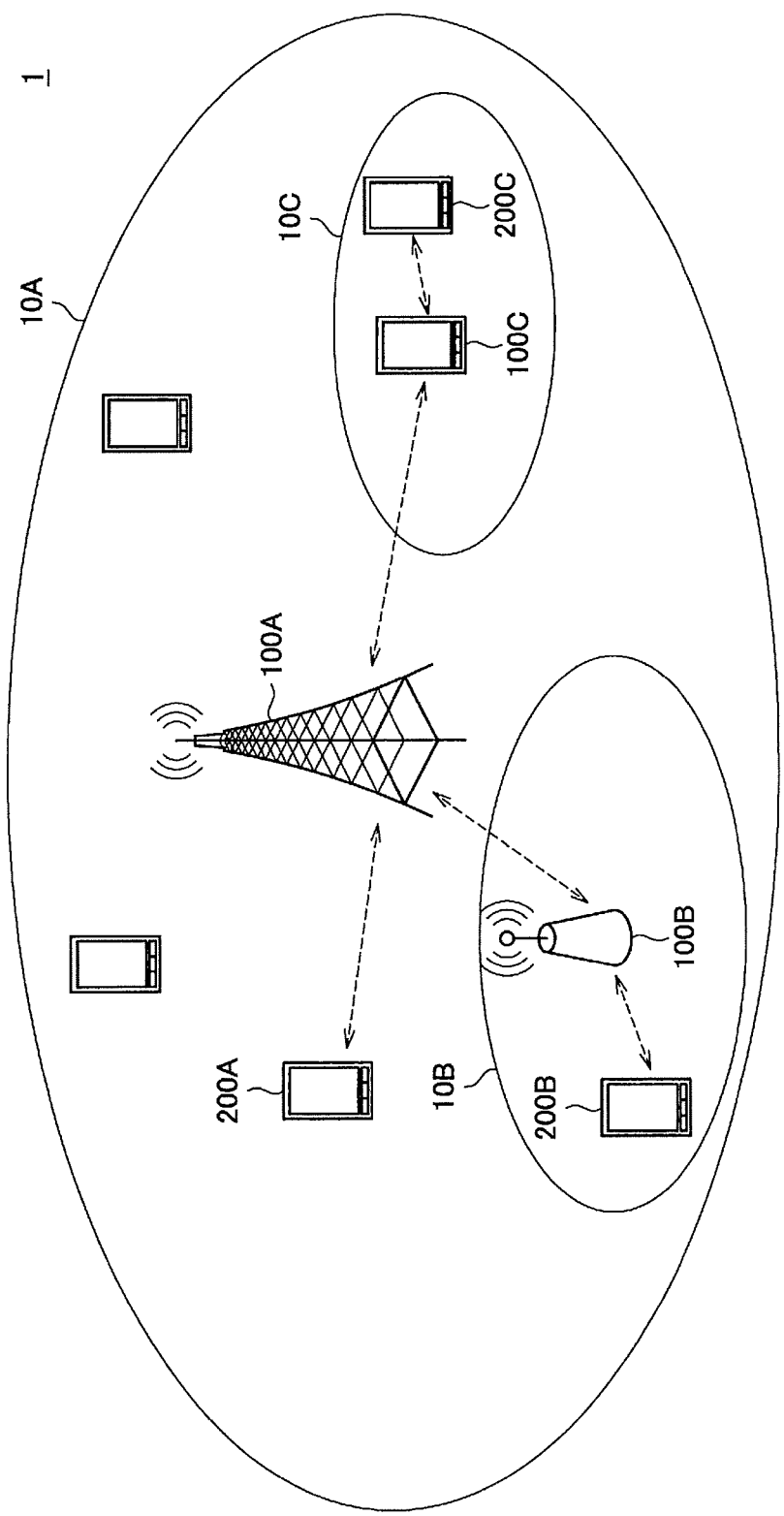
FIG. 5 is an explanatory diagram for describing an example of a schematic configuration of a system according to an embodiment of the present disclosure.

First, an example of a schematic configuration of a system 1 according to an embodiment of the present disclosure will be described with reference to FIG. 5. FIG. 5 is an explanatory diagram for describing an example of the schematic configuration of the system 1 according to the embodiment of the present disclosure. As illustrated in FIG. 5, the system 1 includes a wireless communication apparatus 100 and a terminal apparatus 200. Here, the terminal apparatus 200 is also referred to as a user. The user can also be referred to as a UE. A wireless communication apparatus 100C is also referred to as UE-Relay. The UE described here may be a UE defined in LTE or LTE-A, and UE-Relay may be a Prose UE to Network Relay discussed in 3GPP or may further generally mean a communication device.

(1) Wireless Communication Apparatus 100

The wireless communication apparatus 100 is an apparatus that provides wireless communication services to subordinate apparatuses. For example, the wireless communication apparatus 100A is a base station of a cellular system (or a mobile communication system). The base station 100A performs wireless communication with an apparatus (for example, the terminal apparatus 200A) located within a cell 10A of the base station 100A. For example, the base station 100A transmits a downlink signal to the terminal apparatus 200A and receives an uplink signal from the terminal apparatus 200A.

The base station 100A is theoretically connected to another base station by an X2 interface and can transmit and receive control information and the like. In addition, the base station 100A is theoretically connected to a so-called core network (omitted in the drawing) by an S1 interface, for example, and can transmit and receive control information and the like. Note that communication between these apparatuses can be physically relayed by a variety of apparatuses.

Here, the wireless communication apparatus 100A illustrated in FIG. 5 is a macrocell base station while the cell 10A is a macrocell. Meanwhile, the wireless communication apparatuses 100B and 100C are master devices that run small cells 10B and 10C, respectively. In one example, the master device 100B is a small-cell base station that is fixedly installed. The small-cell base station 100B establishes a wireless backhaul link with the macrocell base station 100A and access links with one or more terminal apparatuses (for example, a terminal apparatus 200B) in the small cell 10B. Note that the wireless communication apparatus 100B may be a relay node defined in 3GPP. The master device 100C is a dynamic access point (AP). The dynamic AP 100C is a mobile device that dynamically runs the small cell 10C. The dynamic AP 100C establishes a wireless backhaul link with the macrocell base station 100A and access links with one or more terminal apparatuses (for example, a terminal apparatus 200C) in the small cell 10C. The dynamic AP 100C may be a terminal apparatus on which hardware or software capable of running as a base station or a wireless access point is mounted, for example. The small cell 10C in this case is a local network (localized network virtual cell) that is dynamically formed.

The cell 10A may be run in accordance with an arbitrary wireless communication scheme such as LTE, LTE-Advanced (LTE-A), LTE-ADVANCED PRO, GSM (registered trademark), UNITS, W-CDMA, CDMA 200, WiMAX, WiMAX 2, or IEEE 802.16.

Note that the concept of a small cell can include a variety of kinds of cells (for example, a femtocell, a nanocell, a picocell, a microcell, and the like) that are smaller than a macrocell, which are arranged such that they are overlaid or not overlaid on a macrocell. In a certain example, the small cell is run by a dedicated base station. In another example, the small cell is run by a terminal that is a master device temporarily operating as a small-cell base station. A so-called relay node can also be regarded as a form of the small-cell base station. The wireless communication apparatus that functions as a parent station of the relay node is also referred to as a donor base station. The donor base station may be DeNB in LTE or may more generally be the parent station of the relay node.

(2) Terminal Apparatus 200

The terminal apparatus 200 can perform communication in the cellular system (or the mobile communication system). The terminal apparatus 200 performs wireless communication with the wireless communication apparatus of the cellular system (for example, the base station 100A, the master device 100B or 100C). For example, the terminal apparatus 200A receives a downlink signal from the base station 100A and transmits an uplink signal to the base station 100A.

(3) Supplementary Note

Although the schematic configuration of the system 1 has been described above, the present technology is not limited to the example illustrated in FIG. 5. For example, a configuration that does not include the master device, small cell enhancement (SCE), a heterogeneous network (HetNet), a machine type communication (MTC) network, or the like can be employed as the configuration of the system 1.

2.2. Example of Configuration of Base Station

Figure 6:
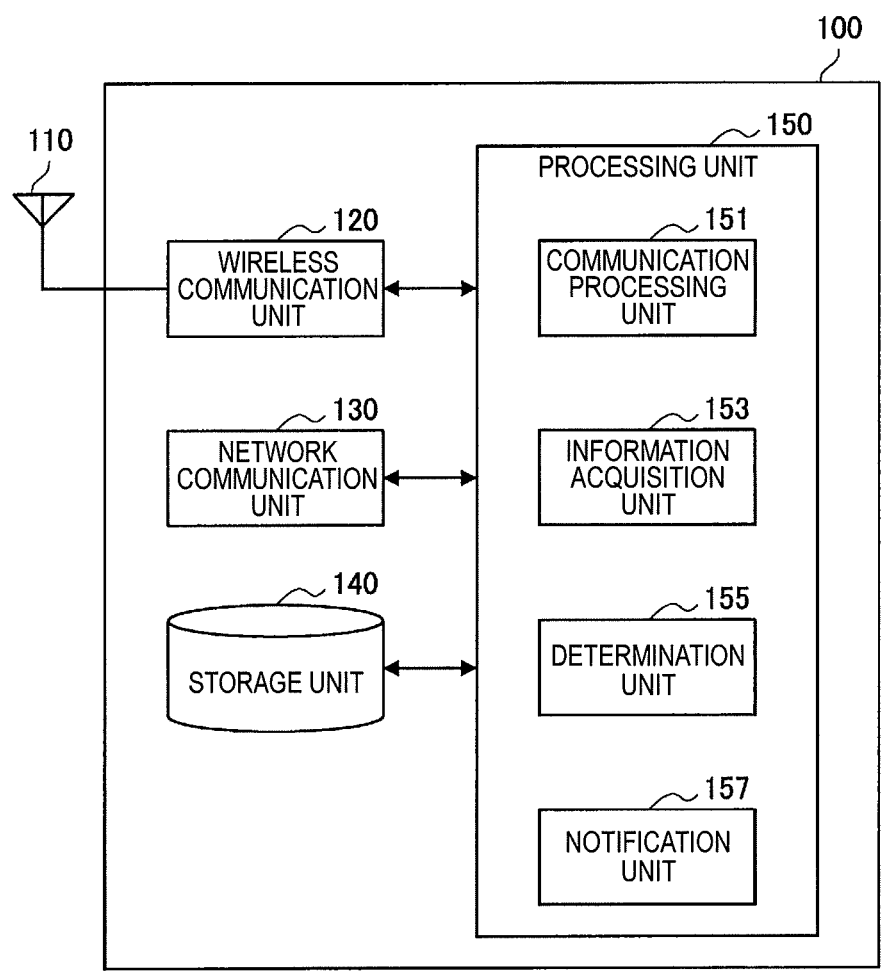
FIG. 6 is a block diagram illustrating an example of a configuration of a base station according to the present embodiment.

Next, a configuration of the base station 100 according to an embodiment of the present disclosure will be described with reference to FIG. 6. FIG. 6 is a block diagram illustrating an example of a configuration of the base station 100 according to an embodiment of the present disclosure. Referring to FIG. 6, the base station 100 includes an antenna unit 110, a wireless communication unit 120, a network communication unit 130, a storage unit 140, and a processing unit 150.

(1) Antenna Unit 110

The antenna unit 110 radiates signals outputted from the wireless communication unit 120 into space as radio waves. Further, the antenna unit 110 converts radio waves in space into signals, and outputs the signals to the wireless communication unit 120.

(2) Wireless Communication Unit 120

The wireless communication unit 120 transmits and receives signals. For example, the wireless communication unit 120 transmits a downlink signal to the terminal apparatus, and receives an uplink signal from the terminal apparatus.

(3) Network Communication Unit 130

The network communication unit 130 transmits and receives information. For example, the network communication unit 130 transmits information to other nodes and receives information from the other nodes. Examples of other nodes include other base stations and core network nodes.

(4) Storage Unit 140

The storage unit 140 temporarily or permanently stores programs and various types of data for an operation of the base station 100.

(5) Processing Unit 150

The processing unit 150 provides various functions of the base station 100. The processing unit 150 includes a communication processing unit 151, an information acquisition unit 153, a determination unit 155, and a notification unit 157. Note that the processing unit 150 may further include components other than these components. In other words, the processing unit 150 may also perform operations other than the operations of these components.

The operations of the communication processing unit 151, the information acquisition unit 153, the determination unit 155, and the notification unit 157 will be described below in detail.

2.3. Example of Configuration of Terminal Apparatus

Figure 7:
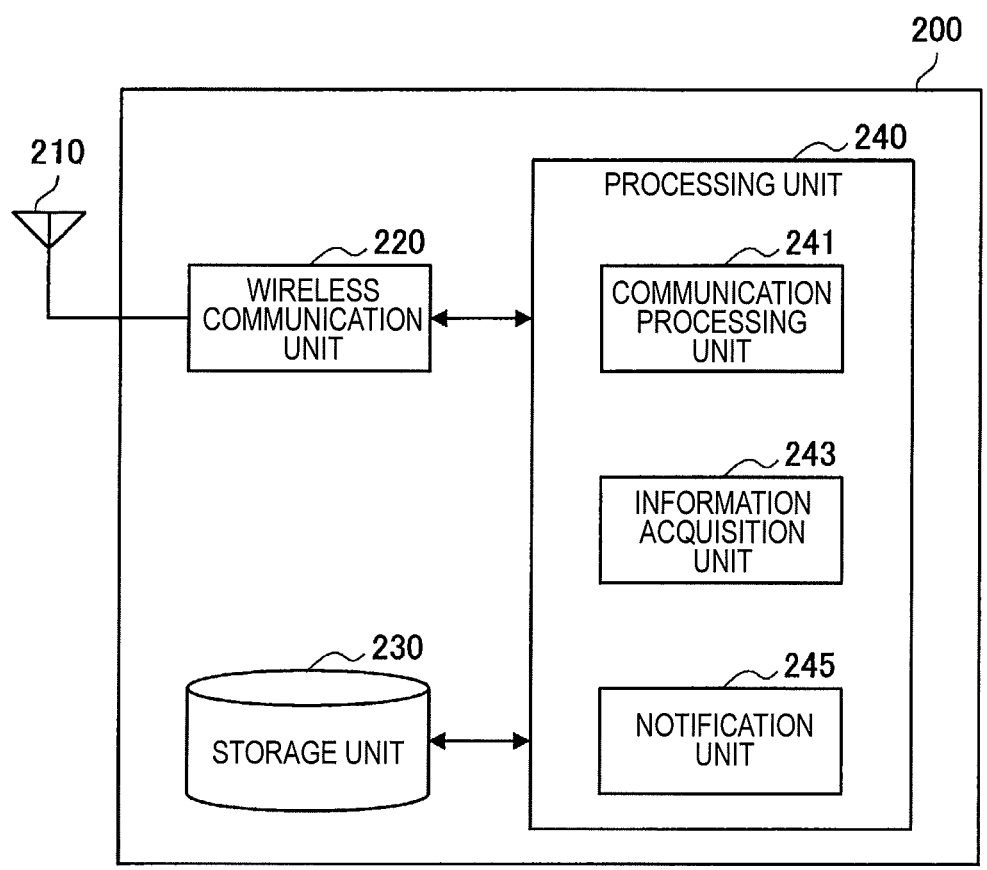
FIG. 7 is a block diagram illustrating an example of a configuration of a terminal apparatus according to the present embodiment.

Next, an example of the configuration of the terminal apparatus 200 according to an embodiment of the present disclosure will be described with reference to FIG. 7. FIG. 7 is a block diagram illustrating an example of a configuration of a terminal apparatus 200 according to an embodiment of the present disclosure. As illustrated in FIG. 7, the terminal apparatus 200 includes an antenna unit 210, a wireless communication unit 220, a storage unit 230, and a processing unit 240.

(1) Antenna Unit 210

The antenna unit 210 radiates signals outputted from the wireless communication unit 220 into space as radio waves. Further, the antenna unit 210 converts radio waves in space into signals, and outputs the signals to the wireless communication unit 220.

(2) Wireless Communication Unit 220

The wireless communication unit 220 transmits and receives signals. For example, the wireless communication unit 220 receives a downlink signal from the base station and transmits an uplink signal to the base station.

(3) Storage Unit 230

The storage unit 230 temporarily or permanently stores programs and various types of data for an operation of the terminal apparatus 200.

(4) Processing Unit 240

The processing unit 240 provides various functions of the terminal apparatus 200. For example, the processing unit 240 includes a communication processing unit 241, an information acquisition unit 243, and a notification unit 245. Note that the processing unit 240 may further include components other than these components. In other words, the processing unit 240 may also perform operations other than the operations of these components.

The operations of the communication processing unit 241, the information acquisition unit 243, and the notification unit 245 will be described below in detail.

3. Technical Features

Next, technical features of the present disclosure will be described.

(1) Basic Idea

First, a basic idea of the technical features of the system 1 according to the embodiment will be described. In the system 1 according to the embodiment, the base station 100 sets the aforementioned sTTI as the minimum unit of the transmission time in accordance with the delay time in accordance with the environment of the communication with the terminal apparatus 200, the processing time on the side of the terminal apparatus 200 in accordance with the performance and the like of the terminal apparatus 200 and the like.

Specifically, in the system 1 according to the embodiment, each terminal apparatus 200 notifies the base station 100 of the processing time, (that is, the terminal processing time, also referred to as a "processing tome $T_{UE}$" below) required for each terminal apparatus 200 to execute the respective kinds of processing such as decoding of received data and generation of transmission data at a predetermined timing. The base station 100 determines whether or not it is possible to set sTTI on the basis of the processing time $T_{UE}$ provided in the notification from the terminal apparatus 200 and the timing advance value $T_{ADV}$ in accordance with the distance from the terminal apparatus 200. More specifically, the base station 100 sets the aforementioned sTTI as the minimum unit of the transmission time in a case in which the condition formula described below as (Equation 1) is satisfied.

[Math. 1]

$$T_{UE} + T_{ADV} < a * \text{sTTI} \quad \text{(Equation 1)}$$

Note that in (Equation 1) above, the coefficient a is a constant decided in accordance with a period of time after the terminal apparatus 200 receives data from the base station 100 until the terminal apparatus 200 transmits data to the base station 100. In addition, the coefficient a may be decided in accordance with a cyclic prefix (CP) type. In a specific example in which FDD is employed in LTE as described above with reference to FIG. 4, the terminal apparatus 200 transmits data to the base station 100 4*sTTI after the terminal apparatus 200 receives data from the base station 100. In this case, the terminal processing time that does not take $T_{ADV}$ into consideration is 3*sTTI, and the coefficient a=3.

Note that in a case of TDD, a period of time after the terminal apparatus 200 receives data from the base station 100 until the terminal apparatus 200 transmits data to the base station 100 (in other words, a data transmission timing) differs in accordance with an uplink/downlink configuration. Therefore, the value of the coefficient a does not necessarily satisfy a=3 and differs in accordance with the configuration. For example, Table 1 illustrated below illustrates examples of a data transmission timing after the reception of the uplink grant (UL Grant) is detected in TDD. Note that Table 1 summarizes k values in a case in which it is assumed that data is transmitted in the sub-frame n+k after the uplink grant is detected in the sub-frame n.

TABLE 1

Transmission timing after reception of grand in TDD (k value)

| TDD configuration | Sub-frame number | | | | | | | | | |
|---|---|---|---|---|---|---|---|---|---|---|
| | 0 | 1 | 2 | 3 | 4 | 5 | 6 | 7 | 8 | 9 |
| 0 | 4 | 6 | | | | 4 | 6 | | | |
| 1 | | 6 | | | 4 | | 6 | | | 4 |
| 2 | | | | 4 | | | | | 4 | |
| 3 | 4 | | | | | | | | 4 | 4 |
| 4 | | | | | | | | | 4 | 4 |
| 5 | | | | | | | | | 4 | |
| 6 | 7 | 7 | | | | 7 | 7 | | | 5 |

The value of the coefficient a in the case in which TDD is applied is decided on the basis of the content illustrated as Table 1. For example, Table 2 illustrated below illustrates examples of setting of the coefficient a in TDD.

TABLE 2 a value in TDD

| TDD configuration | Sub-frame number | | | | | | | | | |
|---|---|---|---|---|---|---|---|---|---|---|
| | 0 | 1 | 2 | 3 | 4 | 5 | 6 | 7 | 8 | 9 |
| 0 | 3 | 5 | | | | 3 | 5 | | | |
| 1 | | 5 | | | 3 | | 5 | | | 3 |
| 2 | | | | 3 | | | | | 3 | |
| 3 | 3 | | | | | | | | 3 | 3 |
| 4 | | | | | | | | | 3 | 3 |
| 5 | | | | | | | | | 3 | |
| 6 | 6 | 6 | | | | 6 | 6 | | | 4 |

That is, the period of time corresponding to a*TTI is any one of 3*TTI, 4*TTI, 5*TTI, and 6*TTI in TDD as illustrated in Table 2.

As described above, the coefficient a is set in accordance with which of FDD and TDD is employed in the system 1 and the CP type. In addition, in a case in which TDD is employed, the coefficient a is set depending on the configuration. In this manner, the coefficient a is set in accordance with properties of the system. Therefore, it is only necessary for the base station 100 to recognize the coefficient a by referring to predetermined setting that indicates the properties of the system, for example.

Then, a*sTTI is compared with a sum of the processing time $T_{UE}$ in the terminal apparatus 200 and the timing advance value $T_{ADV}$ as represented by (Equation 1) in the system 1 according to the embodiment. Here, the timing advance value $T_{ADV}$ is an element that is defined on the basis of the distance between the base station 100 and the terminal apparatus 200 and is not affected by the setting value of sTTI. Meanwhile, there is a possibility that $T_{UE}$ is affected by a transport block size (that is, the size of data processed at one time). Therefore, it is possible to assume that $T_{UE}$ is further shortened since the transport block size becomes shorter by sTTI becoming shorter.

In addition, there is a high possibility that hardware performance of the terminal apparatus 200 will also be diversified as applications and use cases are diversified in the future. For example, there is a possibility that operations with suppressed calculation speeds will be required by a low-cost and low-power-consumption terminal apparatus such as a machine type communication (MTC) terminal. In addition, there is also a possibility that hardware with a higher performance will be applied to a smartphone or the like with a higher performance in order to further improve throughput.

In the system 1 according to the embodiment, the base station 100 can recognize a processing time that differs for each terminal apparatus 200 in accordance with the communication environment and the performance by acquiring information regarding the processing time $T_{UE}$ from the terminal apparatus 200 under the condition described above. In this manner, the base station 100 can selectively switch whether or not to apply sTTI and set sTTI with a more preferred TTI length in an adaptive manner in accordance with the condition.

(2) Processing

Next, an example of a flow of a series of processing regarding the setting of sTTI will be described.

Figure 8:
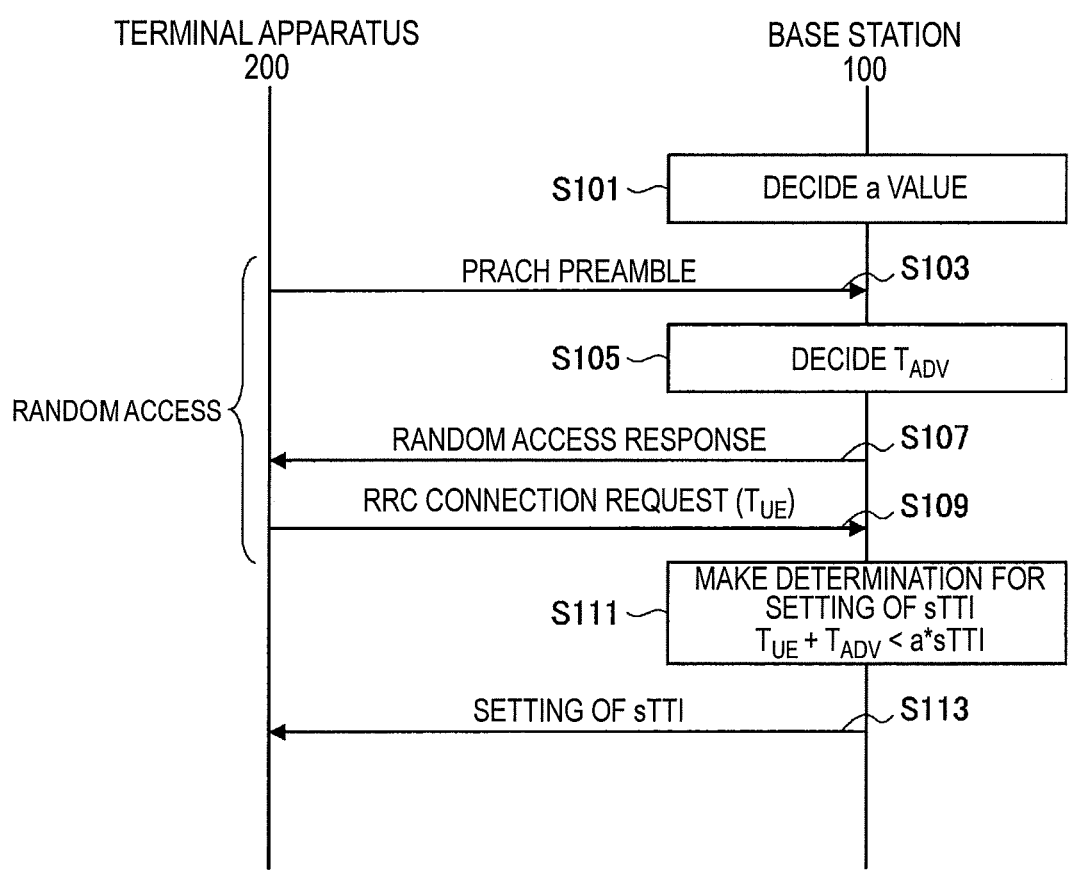
FIG. 8 is a sequence diagram illustrating an example of a flow of a series of processing performed in the system according to the present embodiment.

(a) Control at Time of Establishment of Connection Between Base Station and Terminal Apparatus First, an example of a flow of processing regarding the setting of sTTI will be described by focusing on processing performed when the connection between the base station 100 and the terminal apparatus 200 is established, with reference to FIG. 8. FIG. 8 is a sequence diagram illustrating an example of the flow of the series of processing performed in the system according to the embodiment and illustrates an example of the flow of the processing regarding the setting of sTTI when the connection between the base station 100 and the terminal apparatus 200 is established.

Specifically, the base station 100 (determination unit 155) checks the properties of the system 1, that is, which of FDD and TDD is employed and the CP type, and in a case in which TDD is employed, the base station 100 checks setting of the configuration and the like thereof first. Then, the base station 100 decides the coefficient a in accordance with the result of the checking of the setting (S101).

Then, a series of processing (that is, a random access procedure) for the terminal apparatus 200 to connect to the base station 100 is executed. Specifically, the terminal apparatus 200 (communication processing unit 241) transmits a predetermined preamble to the base station 100 via a physical random access channel (PRACH) first (S103). The base station 100 (communication processing unit 151) detects the preamble transmitted from the terminal apparatus 200 via the PRACH and decides an initial value of the timing advance value $T_{ADV}$ on the basis of the result of detecting the preamble (S105). In addition, the base station 100 (communication processing unit 151) transmits a random access response to the terminal apparatus 200 (S107).

The terminal apparatus 200 (communication processing unit 241) receives the random access response from the base station 100 and then transmits an RRC connection request (RRC Connection Request) to the base station 100. At this time, the terminal apparatus 200 (notification unit 245) notifies the base station 100 of the information regarding the processing time $T_{UE}$ (for example, the processing time $T_{UE}$ itself, an index value indicating the processing time $T_{UE}$, and the like) in association with the RRC connection request (S109). The base station 100 (information acquisition unit 153) receives the notification and then becomes able to recognize the processing time $T_{UE}$ to address the terminal apparatus 200 that is a transmission source of the RRC connection request. Note that the notification unit 245 corresponds to an example of the "control unit" that performs control such that the information decided in accordance with the terminal apparatus (that is, the information regarding the processing time $T_{UE}$) is transmitted to the base station.

Note that the processing time $T_{UE}$ can be calculated as a time required by the terminal apparatus 200 to perform processing on a predetermined amount of data. In a more specific example, a maximum value or a guaranteed value of the time required by the terminal apparatus 200 to complete demodulation processing of data received in a unit TTI time with a unit resource block width may be applied as the processing time $T_{UE}$.

Then, the base station 100 (determination unit 155) determines whether or not to apply sTTI in accordance with whether or not (Equation 1) described above is satisfied on the basis of the coefficient a and the timing advance value $T_{ADV}$ previously decided ant the processing time $T_{UE}$ acquired from the terminal apparatus 200. In addition, the base station 100 (determination unit 155) may set sTTI such that (Equation 1) described above is satisfied at this time (S111). Then, the base station 100 (notification unit 157) notifies the terminal apparatus 200 of the information regarding the setting of sTTI (S113) In this manner, the terminal apparatus 200 can recognize whether or not sTTI has been applied and the setting (for example, the TTI length and the like of applied sTTI) of sTTI. Note that the determination unit 155 corresponds to an example of the "control unit" that decides the minimum unit of the transmission time.

Note that a method in which the base station 100 notifies the terminal apparatus 200 of the information regarding the setting of sTTI is not particularly limited. For example, the base station 100 may notify the terminal apparatus 200 of the information regarding the setting of sTTI by using an existing message. In a more specific example, the base station 100 may utilize "RRC Connection Reconfiguration" for notifying the terminal apparatus 200 of the information regarding the setting of sTTI. In this case, a notification of new information regarding setting of sTTI may be provided by an "otherConfig" information element (IE), for example. Also, a notification of information (for example, an SFN value, a value designating a resource block, and the like) that indicates a location of a resource that is a target of the setting of sTTI may be provide in addition to the information regarding the setting of sTTI.

In addition, a new message for providing notifications of the information regarding the setting of sTTI and the information indicating the location of the resource as the target of the setting of sTTI may be defined in another example.

In addition, a timing at which newly decided sTTI is applied and a method of controlling the timing may be set in accordance with the properties of the system.

For example, the base station 100 receives a response to the notification of the information regarding the setting of sTTI from the terminal apparatus 200 and may apply newly decided sTTI after the reception of the response. More specifically, in a case in which the terminal apparatus 200 receives the notification of the information regarding the setting of sTTI from the base terminal 100, the terminal apparatus 200 may transmit a response message such as "PRCConnectionReconfigurationComplete" as a response to the notification to the base station 100. In this case, the base station 100 may apply newly decided sTTI after a predetermined sub-frame from the reception of the response message from the terminal apparatus 200 or after counting of a predetermined time measured by a timer or the like. In addition, the terminal apparatus 200 may recognize a timing at which newly decided sTTI is applied by a logic that is similar to that for the base station 100.

In addition, the terminal apparatus 200 may recognize the timing at which sTTI is applied on the basis of the information (for example, an SFN number and a resource pool ID (that is, a resource group to which sTTI is applied) of sTTI)

indicating the location of the resource to which the newly decided sTTI is applied from the base station 100 in another example.

In addition, as long as the terminal apparatus 200 can notify the base station 100 of the information regarding the processing time $T_{UE}$, a medium used for the method or the notification thereof is not particularly limited. For example, the terminal apparatus 200 may notify the base station 100 of the information regarding the processing time $T_{UE}$ by utilizing another RRC message other than the RRC connection request. In a specific example, the terminal apparatus 200 may utilize a message such as "RRCConnectionSetupComplete" or "PRCConnectionReconifigurationComplete" for the notification of the information regarding the processing time $T_{UE}$.

In addition, the terminal apparatus 200 may utilize messages such as "Measurement Report", "UE Capability Information", "UE Information Response", and "UE Assistance Information for providing the notification of the information regarding the processing time $T_{UE}$ in another example. For example, the terminal apparatus 200 may include the information regarding the processing time $T_{IDE}$ in "UE Information Response" when the terminal apparatus 200 transmits "UE Information Response" as a response to this "UE Information Request" transmitted from the base station 100. For example, the terminal apparatus 200 is set by "RRCConnectionReconfiguration" such that the terminal apparatus 200 can transmit "Power preference indication" by utilizing "UE Assistance Information" to the base station 100. In a manner similar to that in this case, the terminal apparatus 200 may be set by "RRCConnectionReconfiguration" such that the terminal apparatus 200 can transmit the information regarding the processing time $T_{UE}$ to the base station 100 by utilizing "UE Assistance Information".

In addition, although the above description has been given by focusing on the case in which the existing message is used, it is needless to state that a message for providing a notification of the information regarding the processing time $T_{UE}$ may be newly defined.

The example of the flow of the processing regarding the setting of sTTI has been described above by focusing on the processing performed when the connection between the base station 100 and the terminal apparatus 200 is established with reference to FIG. 8.

(b) Resetting of sTTI in Conjunction with Updating of Timing Advance Value $T_{ADV}$ Next, an example of a flow of processing performed in a case in which sTTI is reset (updated) in conjunction with updating of the timing advance value $T_{ADV}$ will be described.

As described above, the timing advance value $T_{ADV}$ (in other words, a transmission delay time Tpd) depends on the distance between the base station 100 and the terminal apparatus 200. That is, the timing advance value $T_{ADV}$ changes in accordance with movement of the terminal apparatus 200. Therefore, the base station 100 performs updating of the timing advance value $T_{ADV}$ as needed on the basis of a signal received from the terminal apparatus 200. In view of such circumstances, the base station 100 may update (reset) sTTI such that the condition described as (Equation 1) above is satisfied as needed.

Figure 9:
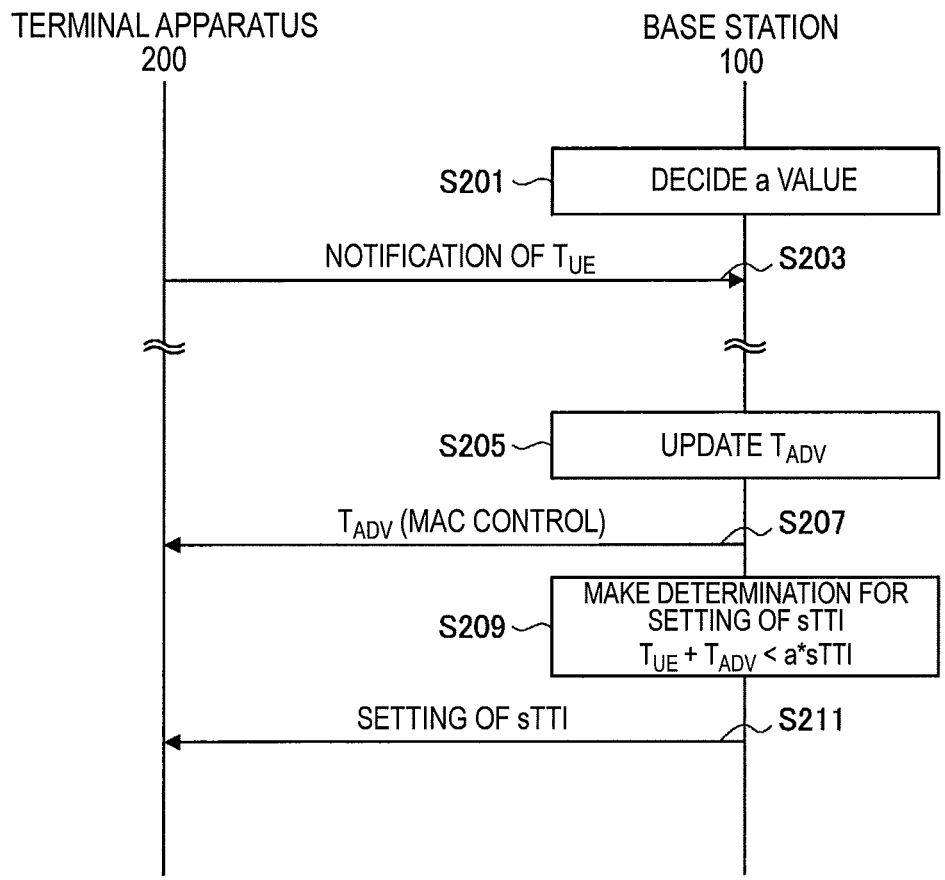
FIG. 9 is a sequence diagram illustrating an example of a flow of a series of processing performed in the system according to the present embodiment.

For example, FIG. 9 is a sequence diagram illustrating an example of a flow of a series of processing performed in the system according to the embodiment and illustrates an example of a flow of processing regarding the resetting of sTTI in conjunction with the updating of the timing advance value $T_{ADV}$.

First, the base station 100 (determination unit 155) decides the coefficient a in accordance with the properties of the system 1 (S201). In addition, the terminal apparatus 200 (notification unit 245) notifies the base station 100 of the information regarding the processing time $T_{UE}$ (S203). Note that this operation is similar to that in the example described above with reference to FIG. 8.

In addition, the base station 100 (communication processing unit 151) performs updating of the timing advance value $T_{ADV}$ as needed on the basis of a signal received from the terminal apparatus 200 (S205). Note that in a case in which the updating of the timing advance value $T_{ADV}$ is performed, the base station 100 (notification unit 157) notifies the terminal apparatus 200 of the information regarding the timing advanced value $T_{ADV}$ after the updating (S207).

Then, the base station 100 (determination unit 155) updates the setting of sTTI such that (Equation 1) described above is satisfied in conjunction with the updating of the timing advance value $T_{ADV}$ (S209). Then, the base station 100 (notification unit 157) notifies the terminal apparatus 200 of the information regarding the setting of sTTI after the updating (S211). Note that a method of providing the notification of the information regarding the setting of sTTI is as described above.

The example of the flow of the processing performed in the case in which sTTI is reset (updated) in conjunction with the updating of the timing advance value $T_{ADV}$ has been described with reference to FIG. 9. Under the control as described above, the base station 100 can reset sTTI in accordance with the environment of the communication (for example, the distance) with the terminal apparatus 200.

(c) Selection of Processing Time $T_{UE}$ from Candidates

Figure 10:
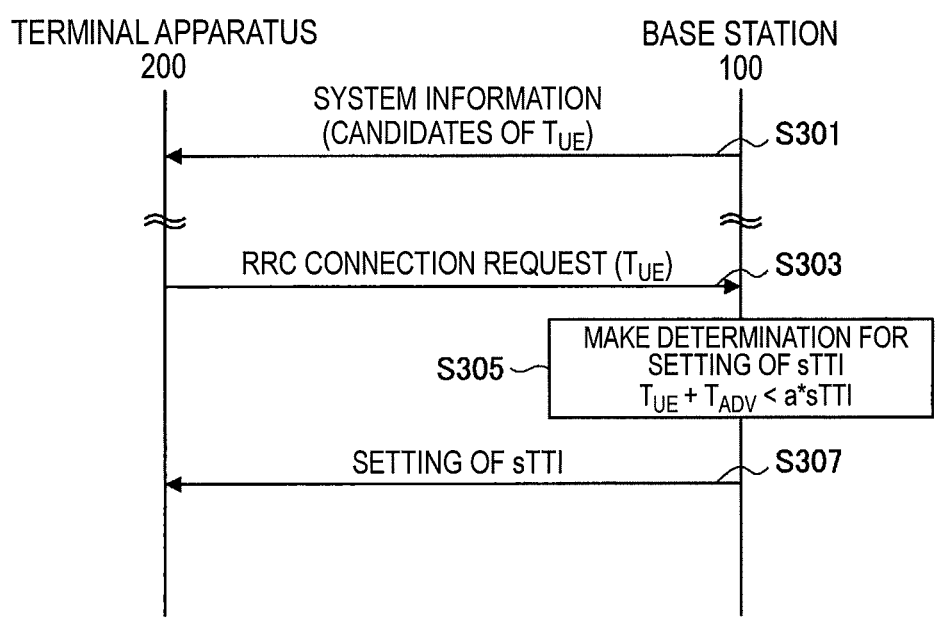
FIG. 10 is a sequence diagram illustrating an example of a flow of a series of processing performed in the system according to the present embodiment.

Next, an example of an operation performed in a case in which the terminal apparatus 200 notifies the base station 100 of the information regarding the processing time $T_{UE}$ will be described. As described above, the terminal apparatus 200 notifies the base station 100 of the processing time $T_{UE}$ required to execute various kinds of processing such as decoding of received data and generation of transmitted data. At this time, the terminal apparatus 200 may select the information to be provided in the notification to the base station in a list of predetermined candidates. Thus, an example of a flow of a series of processing performed in a case in which the terminal apparatus 200 selects the information regarding the processing time $T_{UE}$ provided in the notification to the base station 100 in the list of the predetermined candidates will be described with reference to FIG. 10. FIG. 10 is a sequence diagram illustrating an example of a flow of a series of processing performed in the system according to the embodiment and illustrates an example of a flow of the processing performed in the case in which the terminal apparatus 200 selects the information regarding the processing time $T_{UE}$ in the list of the predetermined candidates.

In FIG. 10, the base station 100 (notification unit 157) manages the list of the candidates of the processing time $T_{UE}$ and distributes the list as system information to the terminal apparatus 200 in the cell (S301). Then, the terminal apparatus 200 (notification unit 245) selects a more preferred processing time $T_{UE}$ from among the candidates in the distributed list on the basis of a time required to complete demodulation processing, for example, and notifies the base station 100 of information indicating the selected candidate as the information regarding the processing time $T_{UE}$ (S303).

Note that as long as the terminal apparatus 200 can notify the base station 100 of the information indicating the selected candidate of the processing time $T_{UE}$, the method thereof is not particularly limited. For example, the terminal apparatus 200 may notify the base station 100 of the information indicating the selected candidate of the processing time $T_{UE}$ through RRC signaling. Alternatively, the terminal apparatus 200 may notify the base station 100 of the information indicating the selected candidate of the processing time $T_{UE}$ through media access control (MAC) control in another example.

Note that the following processing is similar to that in the example described above with reference to FIGS. 8 and 9. That is, the base station 100 (determination unit 155) sets sTTI such that (Equation 1) described above is satisfied, on the basis of the coefficient a and the timing advance value $T_{ADV}$ previously decided and the processing time $T_{UE}$ acquired from the terminal apparatus 200 (S305). Then, the base station 100 (notification unit 157) notifies the terminal apparatus 200 of the information regarding the setting of sTTI (S307).

Note that although the example in which the base station 100 notifies the terminal apparatus 200 of the list of the candidates of the processing time $T_{UE}$ has been described above, the embodiment is not necessarily limited only to the aforementioned example as long as the terminal apparatus 200 can recognize the candidates of the processing time $T_{UE}$. In a specific example, the list of the candidates of the processing time $T_{UE}$ may be defined in advance through an agreement or the like. In this case, the list of the candidates of the processing time $T_{UE}$ may be stored in advance in the terminal apparatus 200, for example. Alternatively, the base station 100 may individually notify the terminal apparatus 200 of the list of the candidates of the processing time $T_{UE}$, through RRC signaling in another example.

The example of the flow of the series of processing performed in the case in which the terminal apparatus 200 selects the information regarding the processing time $T_{UE}$ provided in the notification to the base station 100 in the list of the predetermined candidates has been described above with reference to FIG. 10.

(d) Resetting of sTTI in Accordance with Change in Processing Time $T_{UE}$

Next, an example of a flow of processing performed in a case in which sTTI is reset (updated) in conjunction with a change in the processing time $T_{UE}$ will be described.

Specifically, a case in which the processing time $T_{UE}$ (for example, a time required to demodulate received data, generate transmitted data, and the like) of the terminal apparatus 200 changes can be assumed depending on a state (for example, a processing load or the like) on the side of the terminal apparatus 200. In view of such circumstances, the base station 100 may update (reset) sTTI such that the condition described above as (Equation 1) is satisfied as needed in response to the notification of the information regarding the processing time $T_{UE}$ after the change from the terminal apparatus 200.

Figure 11:
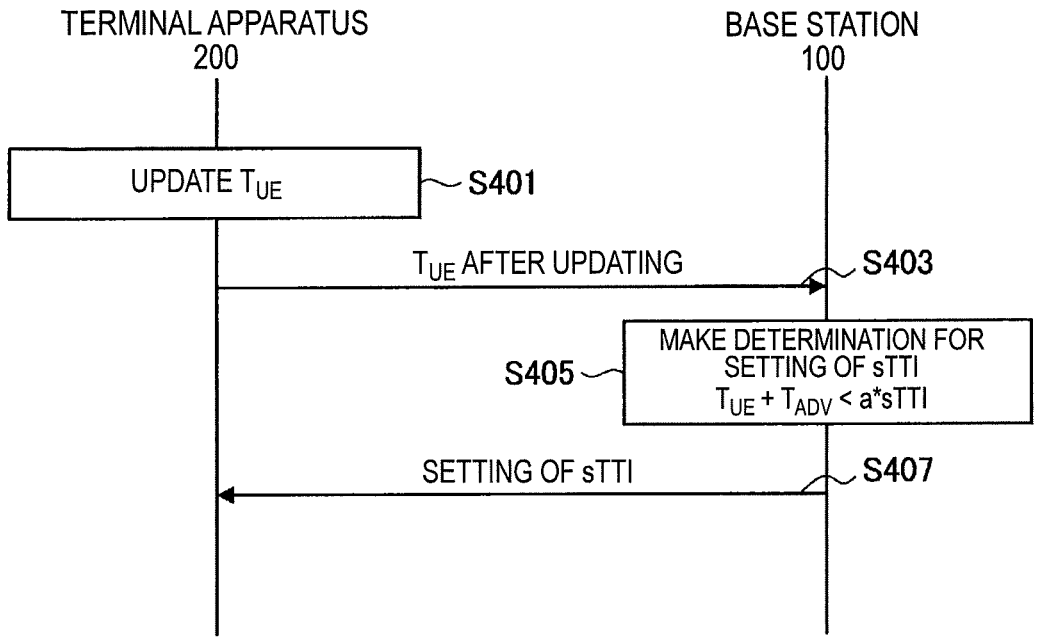
FIG. 11 is a sequence diagram illustrating an example of a flow of a series of processing performed in the system according to the present embodiment.

For example, FIG. 11 is a sequence diagram illustrating an example of a flow of a series of processing performed in the system according to the embodiment and illustrates an example of a flow of processing regarding the resetting of sTTI in conjunction with the updating of the processing time $T_{UE}$.

The terminal apparatus 200 (communication processing unit 241) updates the processing time $T_{UE}$, by calculating the processing time $T_{UE}$ again in a case in which the time required to demodulate received data, generate transmitted data, and the like changes in conjunction with changes in various states or conditions (S401). Note that the method of calculating the processing time $T_{UE}$ is as described above. Then, the terminal apparatus 200 (notification unit 245) notifies the base station 100 of the information regarding the processing time $T_{UE}$ after the updating (S403).

Note that a trigger by which the terminal apparatus 200 updates the processing time $T_{UE}$ (in other words, a trigger by which the terminal apparatus 200 performs the calculation again) or a trigger by which the terminal apparatus 200 provides the notification of the processing time $T_{UE}$ after the updating are not particularly limited. For example, in a case in which the terminal apparatus 200 detects occurrence of a phenomenon (for example, an event or the like) in which a time or the like required to demodulate received data and generate transmitted data can change, the terminal apparatus 200 may update the processing time $T_{UE}$ and notify the base station 100 of the processing time $T_{UE}$ after the updating. Alternatively, the terminal apparatus 200 may periodically update the processing time $T_{UE}$ at every predetermined period of time and notify the base station 100 of the processing time $T_{UE}$ after the updating in another example.

Under the control as described above, the base station 100 can recognize the processing time $T_{UE}$ after the updating in the case in which the processing time $T_{UE}$ is updated by the terminal apparatus 200.

Then, the base station 100 (determination unit 155) updates the setting of sTTI such that (Equation 1) described above is satisfied in a case in which the base station 100 receives the notification of the processing time $T_{UE}$ after the updating from the terminal apparatus 200 (S405). Then, the base station 100 (notification unit 157) notifies the terminal apparatus 200 of information regarding setting of sTTI after the updating (S407). Note that a method of providing the notification of the information regarding the setting of sTTI is as described above.

Under the control as described above, the terminal apparatus 200 can adaptively reset the processing time $T_{UE}$ in accordance with changes in various states and conditions. In addition, the base station 100 can adaptively update the setting of sTTI in accordance with the processing time $T_{UE}$ after the updating even in a case in which the processing time $T_{UE}$ is updated by the terminal apparatus 200.

Figure 12:
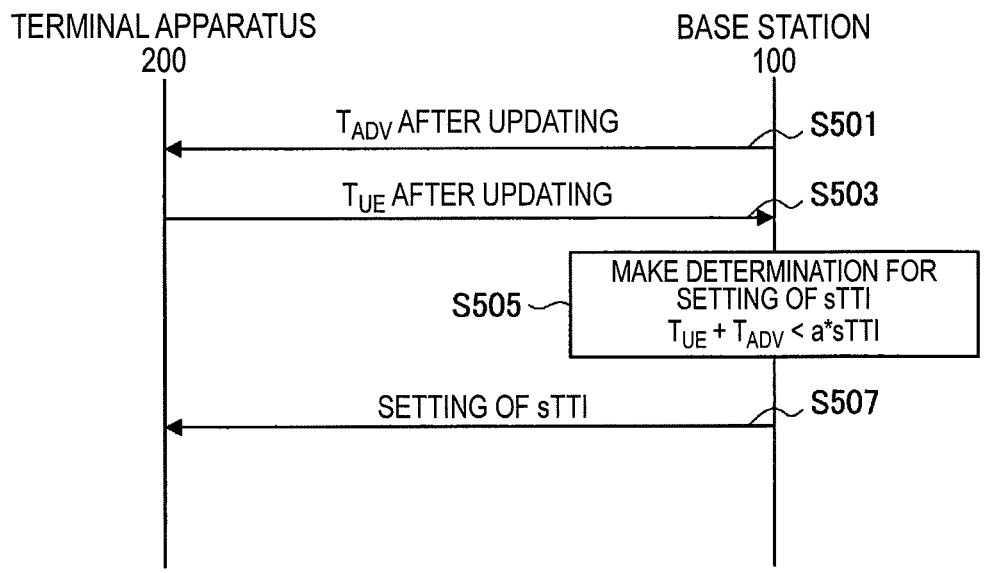
FIG. 12 is a sequence diagram illustrating an example of a flow of a series of processing performed in the system according to the present embodiment.

In addition, FIG. 12 is a sequence diagram illustrating an example of a flow of a series of processing performed in the system according to the embodiment and illustrates another example of the flow of the processing regarding the resetting of sTTI in conjunction with the updating of the processing time $T_{UE}$. Specifically, FIG. 12 illustrates an example in a case in which the terminal apparatus 200 updates (calculates again) the processing time $T_{UE}$ in consideration of the timing advance value $T_{ADV}$ after the updating in a case in which the timing advance value $T_{ADV}$ is updated.

Specifically, the base station 100 (notification unit 157) notifies the terminal apparatus 200 of the information regarding the timing advance value $T_{ADV}$ after updating in a case in which the base station 100 updates the timing advance value $T_{ADV}$ (S501) as described above. In response to the notification, the terminal apparatus 200 (communication processing unit 241) may update the processing time $T_{UE}$ in consideration of the timing advance value $T_{ADV}$ after the updating provided in the notification. Note that a relationship between the timing advance value $T_{ADV}$ and the processing time $T_{UE}$ (in other words, the terminal processing time) is as described above with reference to FIGS. 3 and 4, for example. Then, the terminal apparatus 200 (notification unit 245) notifies the base station 100 of the information regarding the processing time $T_{UE}$ after the updating (S503).

Note that the following processing is similar to that in the example described with reference to FIG. 11. That is, the base station 100 (determination unit 155) updates the setting of sTTI such that (Equation 1) described above is satisfied in a case in which the base station 100 receives the notification of the processing time $T_{UE}$ after the updating from the terminal apparatus 200 (S505). Then, the base station 100 (notification unit 157) notifies the terminal apparatus 200 of information regarding setting of 1sTTI after the updating (S507).

Under the control as described above, the terminal apparatus 200 can adaptively reset the processing time $T_{UE}$ in accordance with the change in the timing advance value $T_{ADV}$.

Figure 13:
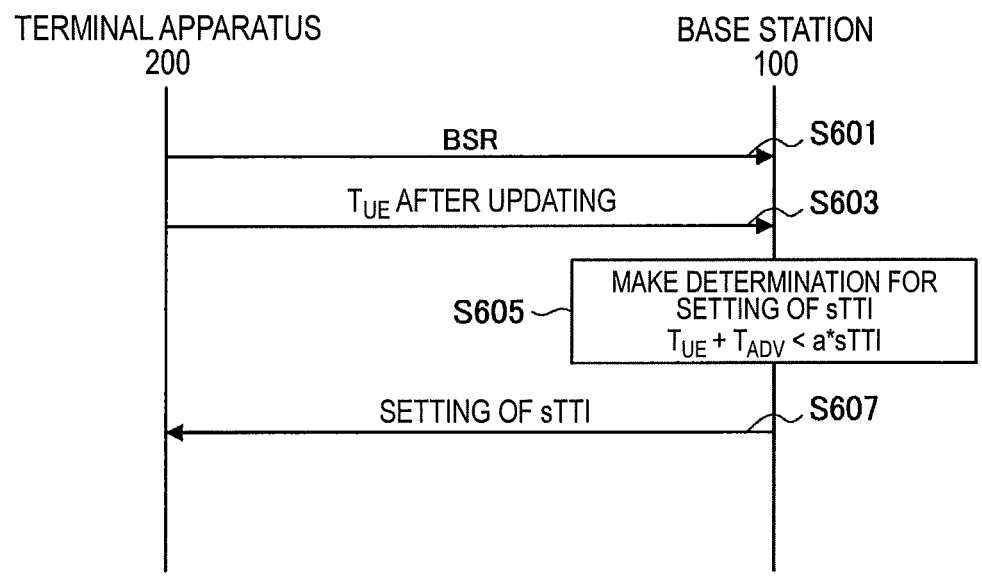
FIG. 13 is a sequence diagram illustrating an example of a flow of a series of processing performed in the system according to the present embodiment.

In addition, the terminal apparatus 200 may be triggered by a buffer status report (BSR) to update the processing time $T_{UE}$ and notify the base station 100 of the processing time $T_{UE}$ after the updating. For example, FIG. 13 is a sequence diagram illustrating an example of a flow of a series of processing performed in the system according to the embodiment and illustrates another example of the flow of the processing regarding the resetting of sTTI in conjunction with the updating of the processing time $T_{UE}$.

Specifically, the terminal apparatus 200 (communication processing unit 241) transmits information regarding the data amount (that is, the transmission buffer amount) of uplink data that remains in the terminal apparatus 200 as BSR to the base station 100 if the uplink data as a target of transmission to the base station 100 occurs (S601). At this time, the terminal apparatus 200 (notification unit 245) is triggered by the BSR to notify the base station 100 of the information regarding the processing time $T_{UE}$ after the updating (S603). Alternatively, the terminal apparatus 200 (notification unit 245) may notify the base station 100 of the information regarding the processing time $T_{UE}$ after the updating such that the information is included in BSR in another example.

Note that BSR is an MAC control command and the notification of the processing time $T_{UE}$ may also be provided through MAC control. In general, an MAC control command is prepared as a mechanism for providing a notification of an operation state of the terminal apparatus 200 in an MAC level in LTE. Although the MAC control command is transmitted to the base station 100 by an MAC control element, higher priority than that of user data is provided thereto when the MAC control command is multiplexed with an MAC protocol data unit (PDU). Note that as the MAC control element, there are a timing advance command MAC control element, a discontinuous reception (DRX) command MAC control element, and the like, for example, in addition to the aforementioned BSR. Note that the timing advance command MAC control element serves as a timing advance command. In addition, the DRX command MAC control element serves as a DRX command.

Note that the following processing is similar to that in the example described with reference to FIG. 11. That is, the base station 100 (determination unit 155) updates the setting of sTTI such that (Equation 1) described above is satisfied in a case in which the base station 100 receives the notification of the processing time $T_{UE}$ after the updating from the terminal apparatus 200 (S605). Then, the base station 100 (notification unit 157) notifies the terminal apparatus 200 of the information regarding the setting of 1sTTI after the updating (S607).

The example of the flow of the processing performed in the case in which s TTI is reset (updated) in conjunction with the change in the processing time $T_{UE}$ has been described above with reference to FIGS. 11 to 13. Under the control as described above, the base station 100 can adaptively reset sTTI in accordance with a state (for example, a state of a load) of the terminal apparatus 200.

4. Application Examples

The technology according to the present disclosure is applicable to various products. The base station 100 may also be implemented, for example, as any type of evolved Node B (eNB) such as macro eNBs and small eNBs. Small eNBs may be eNBs that cover smaller cells than the macrocells, such as pico eNBs, micro eNBs, or home (femto) eNBs. Instead, the base station 100 may be implemented as another type of base station such as Nodes B or base transceiver stations (BTSs). The base station 100 may include the main apparatus (which is also referred to as base station apparatus) that controls wireless communication and one or more remote radio heads (RRHs) that are disposed at different locations from that of the main apparatus. Also, various types of terminals described below may function as the base station 100 by temporarily or semi-permanently executing the functionality of the base station. Furthermore, at least some of structural elements of the base station 100 may be realized in a base station apparatus or a module for a base station apparatus.

Further, the terminal apparatus 200 may be implemented, for example, as a mobile terminal such as smartphones, tablet personal computers (PCs), notebook PCs, portable game terminals, portable/dongle mobile routers, and digital cameras, or an in-vehicle terminal such as car navigation apparatuses. Further, the terminal apparatus 200 may be implemented as a machine type communication (MTC) terminal for establishing a machine to machine (M2M) communication.

Furthermore, at least some of structural elements of the terminal apparatus 200 may be implemented as a module (e.g., integrated circuit module including a single die) that is mounted on these terminals.

4.1. Application Examples for Base Station

First Application Example

Figure 14:
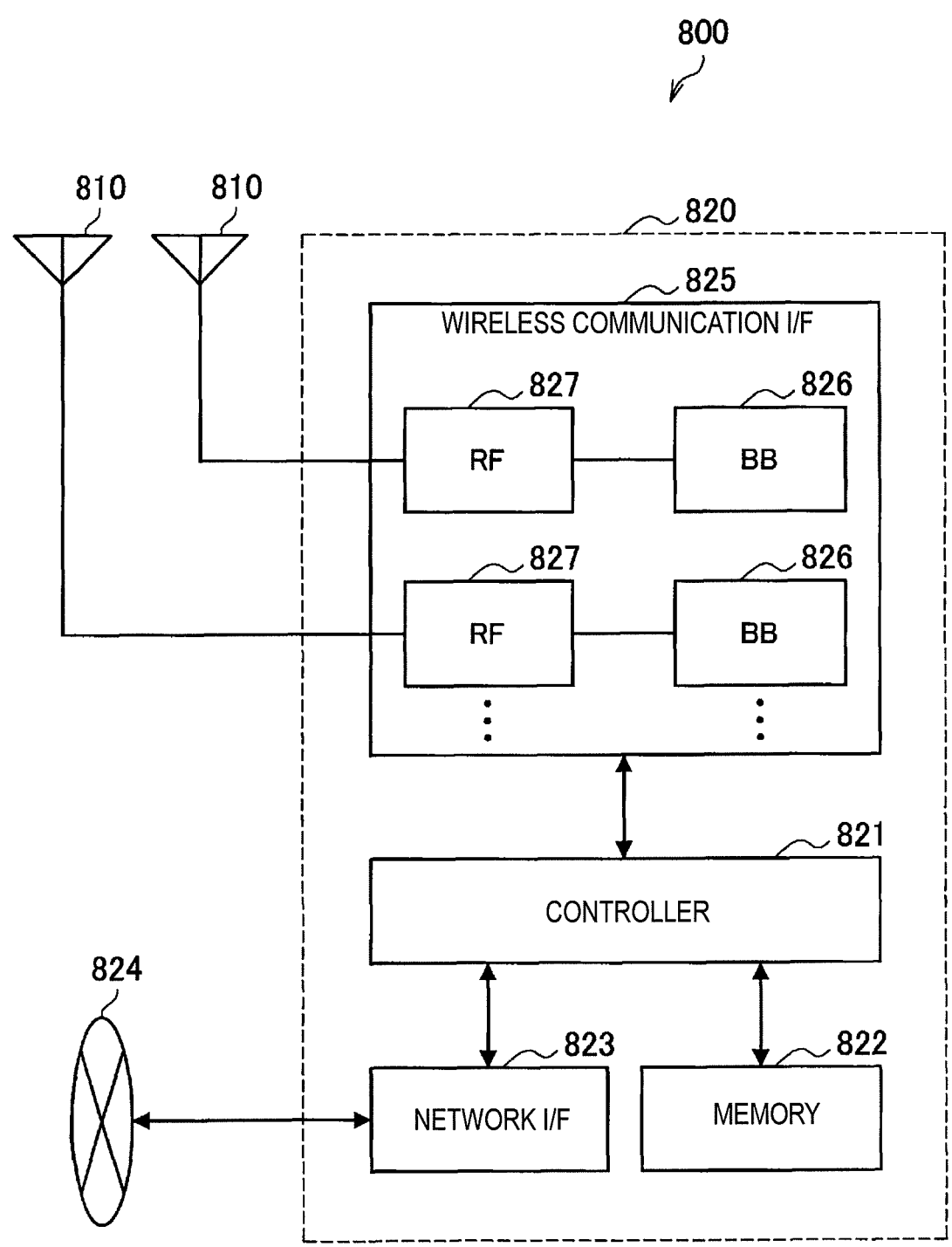
FIG. 14 is a block diagram illustrating a first example of a schematic configuration of an eNB.

FIG. 14 is a block diagram illustrating a first example of a schematic configuration of an eNB to which the technology according to the present disclosure may be applied. An eNB 800 includes one or more antennas 810 and a base station apparatus 820. Each antenna 810 and the base station apparatus 820 may be connected to each other via an RF cable.

Each of the antennas 810 includes a single or a plurality of antenna elements (e.g., a plurality of antenna elements constituting a MIMO antenna) and is used for the base station apparatus 820 to transmit and receive a wireless signal. The eNB 800 may include the plurality of the antennas 810 as illustrated in FIG. 14, and the plurality of antennas 810 may, for example, correspond to a plurality of frequency bands used by the eNB 800. It should be noted that while FIG. 14 illustrates an example in which the eNB 800 includes the plurality of antennas 810, the eNB 800 may include the single antenna 810.

The base station apparatus 820 includes a controller 821, a memory 822, a network interface 823, and a wireless communication interface 825.

The controller 821 may be, for example, a CPU or a DSP, and operates various functions of an upper layer of the base station apparatus 820. For example, the controller 821 generates a data packet from data in a signal processed by the wireless communication interface 825, and transfers the generated packet via the network interface 823. The controller 821 may generate a bundled packet by bundling data from a plurality of baseband processors to transfer the generated bundled packet. Further, the controller 821 may also have a logical function of performing control such as radio resource control, radio bearer control, mobility management, admission control, and scheduling. Further, the control may be performed in cooperation with a surrounding eNB or a core network node. The memory 822 includes a RANI and a ROM, and stores a program executed by the controller 821 and a variety of control data (such as, for example, terminal list, transmission power data, and scheduling data).

The network interface 823 is a communication interface for connecting the base station apparatus 820 to the core network 824. The controller 821 may communicate with a core network node or another eNB via the network interface 823. In this case, the eNB 800 may be connected to a core network node or another eNB through a logical interface (e.g., S1 interface or X2 interface). The network interface 823 may be a wired communication interface or a wireless communication interface for wireless backhaul. In the case where the network interface 823 is a wireless communication interface, the network interface 823 may use a higher frequency band for wireless communication than a frequency band used by the wireless communication interface 825.

The wireless communication interface 825 supports a cellular communication system such as long term evolution (LTE) or LTE-Advanced, and provides wireless connection to a terminal located within the cell of the eNB 800 via the antenna 810. The wireless communication interface 825 may typically include a baseband (BB) processor 826, an RF circuit 827, and the like. The BB processor 826 may, for example, perform encoding/decoding, modulation/demodulation, multiplexing/demultiplexing, and the like, and performs a variety of signal processing on each layer (e.g., L1, medium access control (MAC), radio link control (RLC), and packet data convergence protocol (PDCP)). The BB processor 826 may have part or all of the logical functions as described above instead of the controller 821. The BB processor 826 may be a module including a memory having a communication control program stored therein, a processor to execute the program, and a related circuit, and the function of the BB processor 826 may be changeable by updating the program. Further, the module may be a card or blade to be inserted into a slot of the base station apparatus 820, or a chip mounted on the card or the blade. Meanwhile, the RF circuit 827 may include a mixer, a filter, an amplifier, and the like, and transmits and receives a wireless signal via the antenna 810.

The wireless communication interface 825 may include a plurality of the BB processors 826 as illustrated in FIG. 14, and the plurality of BB processors 826 may, for example, correspond to a plurality of frequency bands used by the eNB 800. Further, the wireless communication interface 825 may also include a plurality of the RF circuits 827, as illustrated in FIG. 14, and the plurality of RF circuits 827 may, for example, correspond to a plurality of antenna elements. Note that FIG. 14 illustrates an example in which the wireless communication interface 825 includes the plurality of BB processors 826 and the plurality of RF circuits 827, but the wireless communication interface 825 may include the single BB processor 826 or the single RF circuit 827.

In the eNB 800 illustrated in FIG. 14, one or more structural elements included in the processing unit 150 (at least any of the communication processing unit 151, the information acquisition unit 153, the determination unit 155, and the notification unit 157) described with reference to FIG. 6 may be implemented by the wireless communication interface 825. Alternatively, at least some of these structural elements may be implemented by the controller 821. As an example, a module which includes a part (for example, the BB processor 826) or all of the wireless communication interface 825 and/or the controller 821 may be mounted in the eNB 800, and the one or more structural elements may be implemented by the module. In this case, the module may store a program for causing the processor to function as the one or more structural elements (i.e., a program for causing the processor to execute operations of the one or more structural elements) and may execute the program. As another example, the program for causing the processor to function as the one or more structural elements may be installed in the eNB 800, and the wireless communication interface 825 (for example, the BB processor 826) and/or the controller 821 may execute the program. As described above, the eNB 800, the base station apparatus 820, or the module may be provided as an apparatus which includes the one or more structural elements, and the program for causing the processor to function as the one or more structural elements may be provided. In addition, a readable recording medium in which the program is recorded may be provided.

In addition, in the eNB 800 illustrated in FIG. 14, the wireless communication unit 120 described with reference to FIG. 6 may be implemented by the wireless communication interface 825 (for example, the RF circuit 827). Moreover, the antenna unit 110 may be implemented by the antenna 810. In addition, the network communication unit 130 may be implemented by the controller 821 and/or the network interface 823. Further, the storage unit 140 may be implemented by the memory 822.

Second Application Example

Figure 15:
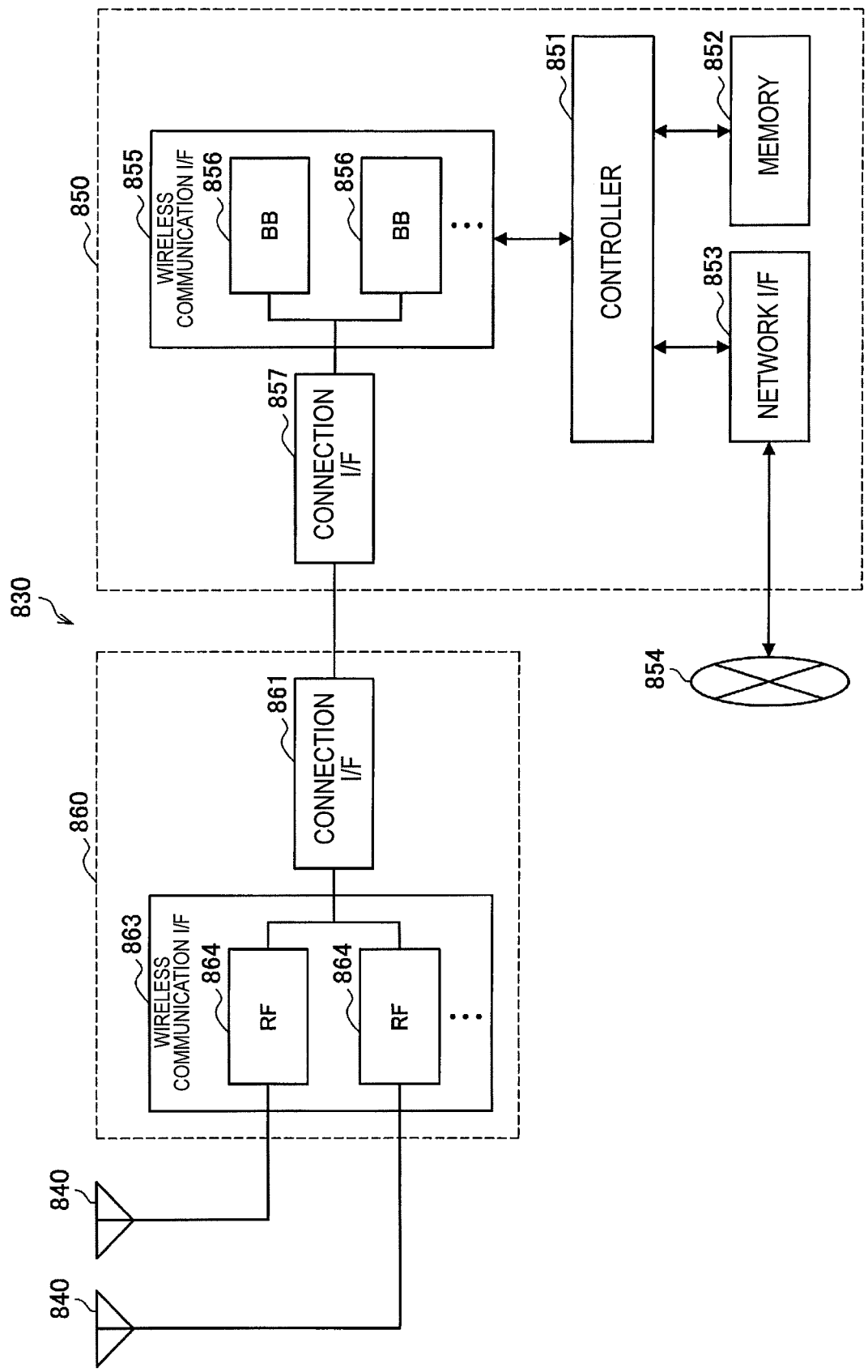
FIG. 15 is a block diagram illustrating a second example of a schematic configuration of an eNB.

FIG. 15 is a block diagram illustrating a second example of a schematic configuration of an eNB to which the technology according to the present disclosure may be applied. An eNB 830 includes one or more antennas 840, a base station apparatus 850, and an RRH 860. Each of the antennas 840 and the RRH 860 may be connected to each other via an RF cable. Further, the base station apparatus 850 and the RRH 860 may be connected to each other by a high speed line such as optical fiber cables.

Each of the antennas 840 includes a single or a plurality of antenna elements (e.g., antenna elements constituting a MIMO antenna), and is used for the RRH 860 to transmit and receive a wireless signal. The eNB 830 may include a plurality of the antennas 840 as illustrated in FIG. 15, and the plurality of antennas 840 may, for example, correspond to a plurality of frequency bands used by the eNB 830. Note that FIG. 15 illustrates an example in which the eNB 830 includes the plurality of antennas 840, but the eNB 830 may include the single antenna 840.

The base station apparatus 850 includes a controller 851, a memory 852, a network interface 853, a wireless communication interface 855, and a connection interface 857. The controller 851, the memory 852, and the network interface 853 are similar to the controller 821, the memory 822, and the network interface 823 described with reference to FIG. 14.

The wireless communication interface 855 supports a cellular communication system such as LTE and LTE-Advanced, and provides wireless connection to a terminal located in a sector corresponding to the RRH 860 via the RRH 860 and the antenna 840. The wireless communication interface 855 may typically include a BB processor 856 or the like. The BB processor 856 is similar to the BB processor 826 described with reference to FIG. 14 except that the BB processor 856 is connected to an RF circuit 864 of the RRH 860 via the connection interface 857. The wireless communication interface 855 may include a plurality of the BB processors 856, as illustrated in FIG. 14, and the plurality of BB processors 856 may, for example, correspond to a plurality of frequency bands used by the eNB 830. Note that FIG. 15 illustrates an example in which the wireless communication interface 855 includes the plurality of BB processors 856, but the wireless communication interface 855 may include the single BB processor 856.

The connection interface 857 is an interface for connecting the base station apparatus 850 (wireless communication interface 855) to the RRH 860. The connection interface 857 may be a communication module for communication on the high speed line which connects the base station apparatus 850 (wireless communication interface 855) to the RRH 860.

Further, the RRH 860 includes a connection interface 861 and a wireless communication interface 863.

The connection interface 861 is an interface for connecting the RRH 860 (wireless communication interface 863) to the base station apparatus 850. The connection interface 861 may be a communication module for communication on the high speed line.

The wireless communication interface 863 transmits and receives a wireless signal via the antenna 840. The wireless communication interface 863 may typically include the RF circuit 864 or the like. The RF circuit 864 may include a mixer, a filter, an amplifier and the like, and transmits and receives a wireless signal via the antenna 840. The wireless communication interface 863 may include a plurality of the RF circuits 864 as illustrated in FIG. 15, and the plurality of RF circuits 864 may, for example, correspond to a plurality of antenna elements. Note that FIG. 15 illustrates an example in which the wireless communication interface 863 includes the plurality of RF circuits 864, but the wireless communication interface 863 may include the single RF circuit 864.

In the eNB 830 illustrated in FIG. 15, one or more structural elements included in the processing unit 150 (at least any of the communication processing unit 151, the information acquisition unit 153, the determination unit 155, and the notification unit 157) described with reference to FIG. 4 may be implemented by the wireless communication interface 855 and/or the wireless communication interface 863. Alternatively, at least some of these structural elements may be implemented by the controller 851. As an example, a module which includes a part (for example, the BB processor 856) or all of the wireless communication interface 855 and/or the controller 851 may be mounted in the eNB 830, and the one or more structural elements may be implemented by the module. In this case, the module may store a program for causing the processor to function as the one or more structural elements (i.e., a program for causing the processor to execute operations of the one or more structural elements) and may execute the program. As another example, the program for causing the processor to function as the one or more structural elements may be installed in the eNB 830, and the wireless communication interface 855 (for example, the BB processor 856) and/or the controller 851 may execute the program. As described above, the eNB 830, the base station apparatus 850, or the module may be provided as an apparatus which includes the one or more structural elements, and the program for causing the processor to function as the one or more structural elements may be provided. In addition, a readable recording medium in which the program is recorded may be provided.

In addition, in the eNB 830 illustrated in FIG. 10, for example, the wireless communication unit 120 described with reference to FIG. 4 may be implemented by the wireless communication interface 863 (for example, the RF circuit 864). Moreover, the antenna unit 110 may be implemented by the antenna 840. In addition, the network communication unit 130 may be implemented by the controller 851 and/or the network interface 853. Further, the storage unit 140 may be implemented by the memory 852.

4.2. Application Examples for Terminal Apparatus

First Application Example

Figure 16:
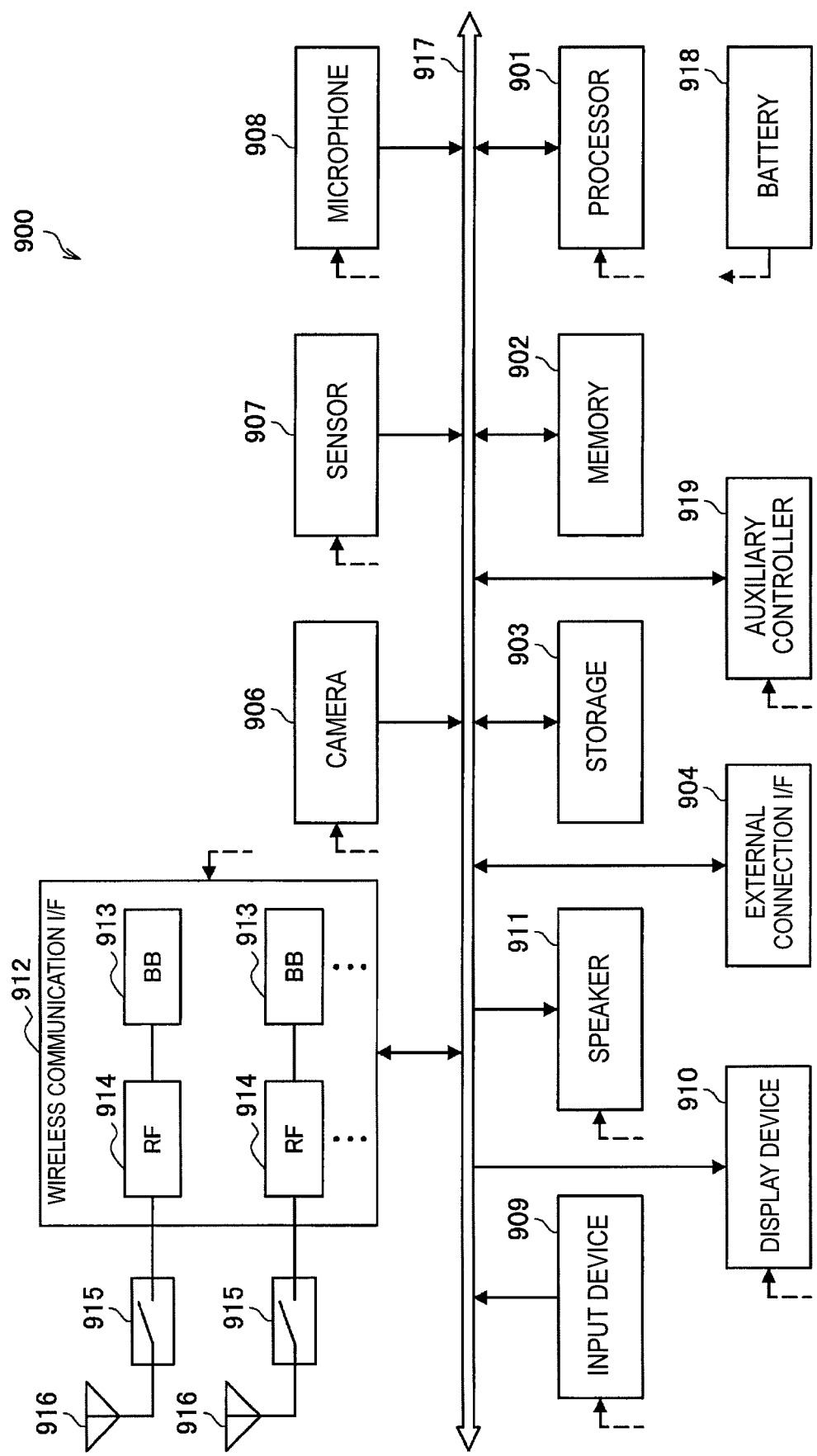
FIG. 16 is a block diagram illustrating an example of a schematic configuration of a smartphone.

FIG. 16 is a block diagram illustrating an example of a schematic configuration of a smartphone 900 to which the technology according to the present disclosure may be applied. The smartphone 900 includes a processor 901, a memory 902, a storage 903, an external connection interface 904, a camera 906, a sensor 907, a microphone 908, an input device 909, a display device 910, a speaker 911, a wireless communication interface 912, one or more antenna switches 915, one or more antennas 916, a bus 917, a battery 918, and an auxiliary controller 919.

The processor 901 may be, for example, a CPU or a system on chip (SoC), and controls the functions of an application layer and other layers of the smartphone 900. The memory 902 includes a RAM and a ROM, and stores a program executed by the processor 901 and data. The storage 903 may include a storage medium such as semiconductor memories and hard disks. The external connection interface 904 is an interface for connecting the smartphone 900 to an externally attached device such as memory cards and universal serial bus (USB) devices.

The camera 906 includes, for example, an image sensor such as charge coupled devices (CCDs) and complementary metal oxide semiconductor (CMOS), and generates a captured image. The sensor 907 may include a sensor group including, for example, a positioning sensor, a gyro sensor, a geomagnetic sensor, an acceleration sensor and the like. The microphone 908 converts a sound that is input into the smartphone 900 to an audio signal. The input device 909 includes, for example, a touch sensor which detects that a screen of the display device 910 is touched, a key pad, a keyboard, a button, a switch or the like, and accepts an operation or an information input from a user. The display device 910 includes a screen such as liquid crystal displays (LCDs) and organic light emitting diode (OLED) displays, and displays an output image of the smartphone 900. The speaker 911 converts the audio signal that is output from the smartphone 900 to a sound.

The wireless communication interface 912 supports a cellular communication system such as LTE or LTE-Advanced, and performs wireless communication. The wireless communication interface 912 may typically include the BB processor 913, the RF circuit 914, and the like. The BB processor 913 may, for example, perform encoding/decoding, modulation/demodulation, multiplexing/demultiplexing, and the like, and performs a variety of types of signal processing for wireless communication. On the other hand, the RF circuit 914 may include a mixer, a filter, an amplifier, and the like, and transmits and receives a wireless signal via the antenna 916. The wireless communication interface 912 may be a one-chip module in which the BB processor 913 and the RF circuit 914 are integrated. The wireless communication interface 912 may include a plurality of BB processors 913 and a plurality of RF circuits 914 as illustrated in FIG. 16. Note that FIG. 16 illustrates an example in which the wireless communication interface 912 includes a plurality of BB processors 913 and a plurality of RF circuits 914, but the wireless communication interface 912 may include a single BB processor 913 or a single RF circuit 914.

Further, the wireless communication interface 912 may support other types of wireless communication system such as a short range wireless communication system, a near field communication system, and a wireless local area network (LAN) system in addition to the cellular communication system, and in this case, the wireless communication interface 912 may include the BB processor 913 and the RF circuit 914 for each wireless communication system.

Each antenna switch 915 switches a connection destination of the antenna 916 among a plurality of circuits (for example, circuits for different wireless communication systems) included in the wireless communication interface 912.

Each of the antennas 916 includes one or more antenna elements (for example, a plurality of antenna elements constituting a MIMO antenna) and is used for transmission and reception of the wireless signal by the wireless communication interface 912. The smartphone 900 may include a plurality of antennas 916 as illustrated in FIG. 16. Note that FIG. 16 illustrates an example in which the smartphone 900 includes a plurality of antennas 916, but the smartphone 900 may include a single antenna 916.

Further, the smartphone 900 may include the antenna 916 for each wireless communication system. In this case, the antenna switch 915 may be omitted from a configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 912, and the auxiliary controller 919 to each other.

The battery 918 supplies electric power to each block of the smartphone 900 illustrated in FIG. 16 via a feeder line that is partially illustrated in the figure as a dashed line. The auxiliary controller 919, for example, operates a minimally necessary function of the smartphone 900 in a sleep mode.

In the smartphone 900 illustrated in FIG. 16, one or more structural elements included in the processing unit 240 (at least any of the communication processing unit 241, the information acquisition unit 243, and the notification unit 245) described with reference to FIG. 7 may be implemented by the wireless communication interface 912. Alternatively, at least some of these structural elements may be implemented by the processor 901 or the auxiliary controller 919. As an example, a module which includes a part (for example, the BB processor 913) or all of the wireless communication interface 912, the processor 901, and/or the auxiliary controller 919 may be mounted in the smartphone 900, and the one or more structural elements may be implemented by the module. In this case, the module may store a program for causing the processor to function as the one or more structural elements (i.e., a program for causing the processor to execute operations of the one or more structural elements) and may execute the program. As another example, the program for causing the processor to function as the one or more structural elements may be installed in the smartphone 900, and the wireless communication interface 912 (for example, the BB processor 913), the processor 901, and/or the auxiliary controller 919 may execute the program. As described above, the smartphone 900 or the module may be provided as an apparatus which includes the one or more structural elements, and the program for causing the processor to function as the one or more structural elements may be provided. In addition, a readable recording medium in which the program is recorded may be provided.

In addition, in the smartphone 900 illustrated in FIG. 16, for example, the wireless communication unit 220 described with reference to FIG. 7 may be implemented by the wireless communication interface 912 (for example, the RF circuit 914). Moreover, the antenna unit 210 may be implemented by the antenna 916. Further, the storage unit 230 may be implemented by the memory 902.

Second Application Example

Figure 17:
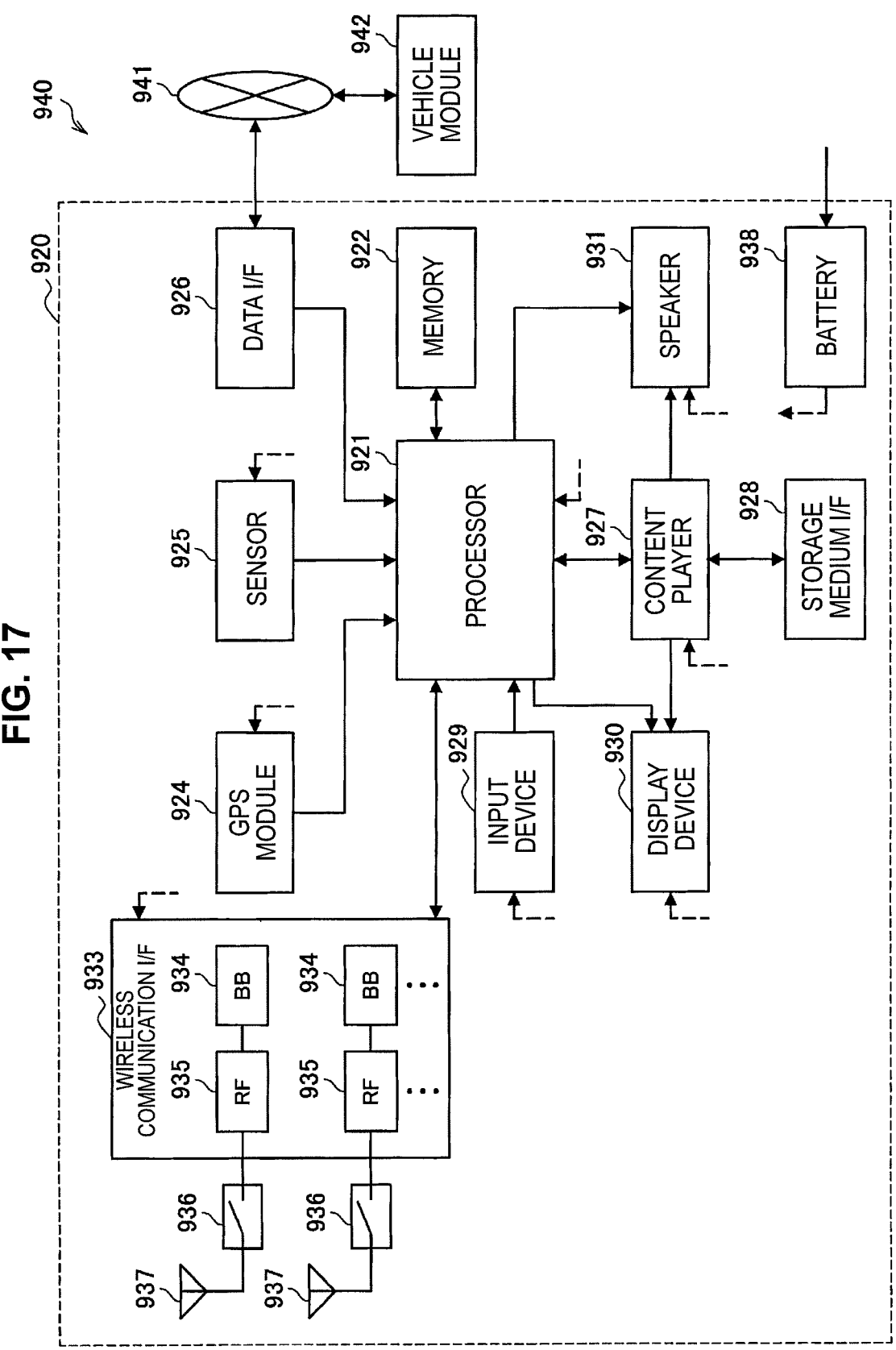
FIG. 17 is a block diagram illustrating an example of a schematic configuration of a car navigation apparatus.

FIG. 17 is a block diagram illustrating an example of a schematic configuration of a car navigation apparatus 920 to which the technology according to the present disclosure may be applied. The car navigation apparatus 920 includes a processor 921, a memory 922, a global positioning system (GPS) module 924, a sensor 925, a data interface 926, a content player 927, a storage medium interface 928, an input device 929, a display device 930, a speaker 931, a wireless communication interface 933, one or more antenna switches 936, one or more antennas 937, and a battery 938.

The processor 921 may be, for example, a CPU or an SoC, and controls the navigation function and the other functions of the car navigation apparatus 920. The memory 922 includes a RAM and a ROM, and stores a program executed by the processor 921 and data.

The GPS module 924 uses a GPS signal received from a GPS satellite to measure the position (e.g., latitude, longitude, and altitude) of the car navigation apparatus 920. The sensor 925 may include a sensor group including, for example, a gyro sensor, a geomagnetic sensor, a barometric sensor and the like. The data interface 926 is, for example, connected to an in-vehicle network 941 via a terminal that is not illustrated, and acquires data such as vehicle speed data generated on the vehicle side.

The content player 927 reproduces content stored in a storage medium (e.g., CD or DVD) inserted into the storage medium interface 928. The input device 929 includes, for example, a touch sensor which detects that a screen of the display device 930 is touched, a button, a switch or the like, and accepts operation or information input from a user. The display device 930 includes a screen such as LCDs and OLED displays, and displays an image of the navigation function or the reproduced content. The speaker 931 outputs a sound of the navigation function or the reproduced content.

The wireless communication interface 933 supports a cellular communication system such as LTE or LTE-Advanced, and performs wireless communication. The wireless communication interface 933 may typically include the BB processor 934, the RF circuit 935, and the like. The BB processor 934 may, for example, perform encoding/decoding, modulation/demodulation, multiplexing/demultiplexing, and the like, and performs a variety of types of signal processing for wireless communication. On the other hand, the RF circuit 935 may include a mixer, a filter, an amplifier, and the like, and transmits and receives a wireless signal via the antenna 937. The wireless communication interface 933 may be a one-chip module in which the BB processor 934 and the RF circuit 935 are integrated. The wireless communication interface 933 may include a plurality of BB processors 934 and a plurality of RF circuits 935 as illustrated in FIG. 17. Note that FIG. 17 illustrates an example in which the wireless communication interface 933 includes a plurality of BB processors 934 and a plurality of RF circuits 935, but the wireless communication interface 933 may include a single BB processor 934 or a single RF circuit 935.

Further, the wireless communication interface 933 may support other types of wireless communication system such as a short range wireless communication system, a near field communication system, and a wireless LAN system in addition to the cellular communication system, and in this case, the wireless communication interface 933 may include the BB processor 934 and the RF circuit 935 for each wireless communication system.

Each antenna switch 936 switches a connection destination of the antenna 937 among a plurality of circuits (for example, circuits for different wireless communication systems) included in the wireless communication interface 933.

Each of the antennas 937 includes one or more antenna elements (for example, a plurality of antenna elements constituting a MIMO antenna) and is used for transmission and reception of the wireless signal by the wireless communication interface 933. The car navigation apparatus 920 may include a plurality of antennas 937 as illustrated in FIG. 17. Note that FIG. 17 illustrates an example in which the car navigation apparatus 920 includes a plurality of antennas 937, but the car navigation apparatus 920 may include a single antenna 937.

Further, the car navigation apparatus 920 may include the antenna 937 for each wireless communication system. In this case, the antenna switch 936 may be omitted from a configuration of the car navigation apparatus 920.

The battery 938 supplies electric power to each block of the car navigation apparatus 920 illustrated in FIG. 17 via a feeder line that is partially illustrated in the figure as a dashed line. Further, the battery 938 accumulates the electric power supplied from the vehicle.

In the car navigation apparatus 920 illustrated in FIG. 17, one or more structural elements included in the processing unit 240 (at least any of the communication processing unit 241, the information acquisition unit 243, and the notification unit 245) described with reference to FIG. 7 may be implemented by the wireless communication interface 933. Alternatively, at least some of these structural elements may be implemented by the processor 921. As an example, a module which includes a part (for example, the BB processor 934) or all of the wireless communication interface 933 and/or the processor 921 may be mounted in the car navigation apparatus 920, and the one or more structural elements may be implemented by the module. In this case, the module may store a program for causing the processor to function as the one or more structural elements (i.e., a program for causing the processor to execute operations of the one or more structural elements) and may execute the program. As another example, the program for causing the processor to function as the one or more structural elements may be installed in the car navigation apparatus 920, and the wireless communication interface 933 (for example, the BB processor 934) and/or the processor 921 may execute the program. As described above, the car navigation apparatus 920 or the module may be provided as an apparatus which includes the one or more structural elements, and the program for causing the processor to function as the one or more structural elements may be provided. In addition, a readable recording medium in which the program is recorded may be provided.

In addition, in the car navigation apparatus 920 illustrated in FIG. 17, for example, the wireless communication unit 220 described with reference to FIG. 7 may be implemented by the wireless communication interface 933 (for example, the RF circuit 935). Moreover, the antenna unit 210 may be implemented by the antenna 937. Further, the storage unit 230 may be implemented by the memory 922.

The technology of the present disclosure may also be realized as an in-vehicle system (or a vehicle) 940 including one or more blocks of the car navigation apparatus 920, the in-vehicle network 941, and a vehicle module 942. In other words, the in-vehicle system (or a vehicle) 940 may be provided as an apparatus which includes at least any of the communication processing unit 241, the information acquisition unit 243, and the notification unit 245. The vehicle module 942 generates vehicle data such as vehicle speed, engine speed, and trouble information, and outputs the generated data to the in-vehicle network 941.

5. Conclusion

The embodiment of the present disclosure has been described above in detail with reference to FIGS. 1 to 17. As described above, the terminal apparatus 200 notifies the base station 100 of the processing time $T_{UE}$ decided in accordance with the terminal apparatus 200 in the system according to the embodiment. In addition, the base station 100 decides the minimum unit (that is, sTTI) of the transmission time in communication with the terminal apparatus 200 on the basis of the processing time $T_{UE}$ decided in accordance with the terminal apparatus 200 and the timing advance value $T_{ADV}$ decided in accordance with the environment of the communication with the terminal apparatus 200. With such a configuration, according to the system of the embodiment, it is possible to set the minimum unit of the transmission time in the wireless communication in a more preferred form in accordance with the environment of the communication between the base station 100 and the terminal apparatus 200 and the state, the performance, and the like of the terminal apparatus 200.

In addition, according to the system of the embodiment, it is possible to adaptively update the minimum unit of the transmission time in accordance with the change in conditions even under the condition in which the environment of the communication between the base station 100 and the terminal apparatus 200 and the state (for example, a processing load) of the terminal apparatus 200 change.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)

An apparatus including:

a communication unit that performs wireless communication; and a control unit that decides a minimum unit of a transmission time in communication via the wireless communication on a basis of a first processing time that is decided in accordance with a terminal apparatus and a second processing time that is decided in accordance with a communication environment.

(2)

The apparatus according to (1), in which the control unit performs control such that information regarding the decided minimum unit is transmitted to the terminal apparatus via the wireless communication.

(3)

The apparatus according to (1) or (2), in which the control unit decides the minimum unit sTTI such that a following condition is satisfied on a basis of a predetermined coefficient a in a case in which the first processing time is defined as $T_{UE}$ and the second processing time is defined as $T_{ADV}$.

$$T_{UE} \pm T_{ADB} < a * \text{sTTI} \qquad \text{[Math. 2]}$$

(4)

The apparatus according to any one of (1) to (3), including:

an acquisition unit that acquires information regarding the first processing time from the terminal apparatus via the wireless communication.

(5)

The apparatus according to (4), in which the control unit performs control such that information regarding a candidate of the first processing time is transmitted to the terminal apparatus via the wireless communication, and the acquisition unit acquires the information regarding the first processing time from the terminal apparatus via the wireless communication after the information regarding the candidate of the first processing time is transmitted to the terminal apparatus.

(6)

The apparatus according to (5), in which the control unit performs control such that the information regarding the candidate of the first processing time is transmitted as system information.

(7)

The apparatus according to any one of (1) to (6), in which the second processing time is decided in accordance with a distance from the terminal apparatus.

(8)

The apparatus according to any one of (1) to (7), in which in a case in which the first processing time is updated, the control unit newly decides the minimum unit in accordance with the first processing time after the updating and performs control such that information regarding the decided minimum unit is transmitted to the terminal apparatus via the wireless communication.

(9)

The apparatus according to any one of (1) to (8), in which in a case in which the second processing time is updated, the control unit newly decides the minimum unit in accordance with the second processing time after the updating and performs control such that information regarding the decided minimum time is transmitted to the terminal apparatus via the wireless communication.

(10)

An apparatus including:

a communication unit that performs wireless communication; and a control unit that performs control such that information indicating a first processing time that is decided in accordance with a terminal apparatus for deciding a minimum time of a transmission time in communication via the wireless communication is transmitted to a base station via the wireless communication.

(11)

The apparatus according to (10), including: an acquisition unit that acquires information regarding the minimum unit decided on a basis of the first processing time and a second processing time decided in accordance with a communication environment from the base station via the wireless communication.

(12)

The apparatus according to (11), in which the acquisition unit acquires the information regarding the minimum unit from the base station via the wireless communication after the information regarding the first processing time is transmitted to the base station.

(13)

The apparatus according to (11) or (12), in which in a case in which the second processing time is updated, the control unit performs control such that information indicating the first processing time in accordance with the second processing time after the updating is transmitted to a base station via the wireless communication.

(14)

The apparatus according to any one of (10) to (13), in which the control unit performs control such that information regarding the first processing time decided from among predetermined candidates is transmitted to the base station via the wireless communication.

(15)

The apparatus according to (14), in which information regarding the candidates of the first processing time is transmitted from the base station via the wireless communication.

(16)

The apparatus according to any one of (10) to (15), in which in a case in which a report regarding a transmission buffer amount is transmitted to the base station, the control unit performs control such that the information indicating the first processing time is transmitted to the base station in association with the report.

(17)

A method including:

performing wireless communication; and deciding, by a processor, a minimum unit of a transmission time on a basis of a first processing time that is decided in accordance with a terminal apparatus and a second processing time that is decided in accordance with a communication environment.

(18)

A method including:

performing wireless communication; and performing, by a processor, control such that information indicating a first processing time that is decided in accordance with a terminal apparatus for deciding a minimum unit of a transmission time in communication via the wireless communication is transmitted to a base station via the wireless communication.

REFERENCE SIGNS LIST 1 system
100 base station 110 antenna unit
120 wireless communication unit
130 network communication unit
140 storage unit
150 processing unit
151 communication processing unit
153 information acquisition unit
155 determination unit
157 notification unit
200 terminal apparatus
210 antenna unit
220 wireless communication unit
230 storage unit
240 processing unit
241 communication processing unit
243 information acquisition unit
245 notification unit

The invention claimed is:

1. An apparatus comprising:
circuitry configured to
perform wireless communication;
acquire a first processing time from a terminal apparatus, the first processing time being a time from completion of data reception to start of data transmission at the terminal apparatus; and
decide a minimum unit of a transmission time in communication via the wireless communication based on the first processing time and a second processing time, the second processing time being decided in accordance with a distance between the apparatus and the terminal apparatus,
wherein the circuitry decides the minimum unit of the transmission time as sTTI according to a following condition;

$$T_{UE}+T_{ADV}<a*\text{sTTI}$$

wherein, the condition is satisfied on a basis of a predetermined coefficient a in a case in which the first processing time is defined as $T_{UE}$ and the second processing time is defined as $T_{ADV}$, the $T_{UE}$ indicating a time for decoding of received data and generation of transmission data at the terminal apparatus, the $T_{ADV}$ indicating a timing advance value determined as roundtrip delay between the apparatus and the terminal apparatus, the coefficient a indicating a system configuration parameter value determined based on a period of time after the apparatus transmits data to the terminal apparatus until the apparatus receives data from the terminal apparatus.

2. The apparatus according to claim 1, wherein the circuitry performs control such that information regarding the decided minimum unit is transmitted to the terminal apparatus via the wireless communication.

3. The apparatus according to claim 1, wherein the circuitry acquires information regarding the first processing time from the terminal apparatus via the wireless communication, the information being related to RRC Connection Request.

4. The apparatus according to claim 3,
wherein the circuitry performs control such that information regarding a candidate of the first processing time is transmitted to the terminal apparatus via the wireless communication, and
the circuitry acquires the information regarding the first processing time from the terminal apparatus via the wireless communication after the information regarding the candidate of the first processing time is transmitted to the terminal apparatus.

5. The apparatus according to claim 4, wherein the circuitry performs control such that the information regarding the candidate of the first processing time is transmitted as system information.

6. The apparatus according to claim 3, wherein the information regarding the first processing time is transmitted from the terminal apparatus, with at least one of the RRC connection request, another RRC message other than the RRC connection request, Measurement Report, UE Capability Information, UE Information Response, and UE Assistance Information.

7. The apparatus according to claim 1, wherein the second processing time is decided based on a result of detecting a preamble which is transmitted via a physical random access channel (PRACH), from the terminal apparatus.

8. The apparatus according to claim 1, wherein in a case in which the first processing time is updated, the circuitry newly decides the minimum unit in accordance with the first processing time after the updating and performs control such that information regarding the decided minimum unit is transmitted to the terminal apparatus via the wireless communication.

9. The apparatus according to claim 1, wherein in a case in which the second processing time is updated, the circuitry newly decides the minimum unit in accordance with the second processing time after the updating and performs control such that information regarding the decided minimum time is transmitted to the terminal apparatus via the wireless communication.

10. The apparatus according to claim 9, wherein in a case in which the second processing time is updated, the circuitry transmits the updated second processing time to the terminal apparatus, and acquires new first processing time updated by the terminal apparatus based on the updated second processing time, and newly decides the minimum unit in accordance with the updated first processing time and the updated second processing time.

11. An apparatus comprising:
circuitry configured to
perform wireless communication; and
perform control such that information indicating a first processing time that is decided in accordance with a terminal apparatus for deciding a minimum time of a transmission time in communication via the wireless communication is transmitted to a base station via the wireless communication, the first processing time being a time from completion of data reception to start of data transmission at the terminal apparatus,
wherein the minimum unit of the transmission time is determined as sTTI according to a following condition;

$$T_{UE}+T_{ADV}<a*\text{sTTI}$$

wherein, the condition is satisfied on a basis of a predetermined coefficient a in a case in which the first processing time is defined as $T_{UE}$, the $T_{UE}$ indicating a time for decoding of received data and generation of transmission data at the terminal apparatus, the $T_{ADV}$ indicating a timing advance value determined as roundtrip delay between the base station and the terminal apparatus, the coefficient a indicating a system configuration parameter value determined based on a period of time after the apparatus transmits data to the terminal apparatus until the base station receives data from the terminal apparatus.

12. The apparatus according to claim 11, wherein the circuitry acquires information regarding the minimum unit decided on a basis of the first processing time and a second processing time decided in accordance with a communication environment from the base station via the wireless communication.

13. The apparatus according to claim 12, wherein in a case in which the second processing time is updated, the circuitry performs control such that information indicating the first processing time in accordance with the second processing time after the updating is transmitted to the base station via the wireless communication.

14. The apparatus according to claim 12, wherein the circuitry acquires the information regarding the minimum unit from the base station via the wireless communication after the information regarding the first processing time is transmitted to the base station.

15. The apparatus according to claim 11, wherein the circuitry performs control such that information regarding the first processing time decided from among predetermined candidates is transmitted to the base station via the wireless communication.

16. The apparatus according to claim 15, wherein information regarding the candidates of the first processing time is transmitted from the base station via the wireless communication.

17. The apparatus according to claim 11, wherein in a case in which a report regarding a transmission buffer amount is transmitted to the base station, the circuitry performs control such that the information indicating the first processing time is transmitted to the base station in association with the report.

18. A method comprising:
performing wireless communication;
acquiring a first processing time from a terminal apparatus, the first processing time being a time from completion of data reception to start of data transmission at the terminal apparatus; and
deciding, by a processor, a minimum unit of a transmission time based on the first processing time and a second processing time, the second processing time being decided in accordance with a distance from the terminal apparatus, wherein the minimum unit of the transmission time is determined as sTTI according to a following condition;

$$T_{UE}+T_{ADV}<a*\text{sTTI}$$

wherein, the condition is satisfied on a basis of a predetermined coefficient a in a case in which the first processing time is defined as $T_{UE}$ and the second processing time is defined as $T_{ADV}$, the $T_{UE}$ indicating a time for decoding of received data and generation of transmission data at the terminal apparatus, the $T_{ADV}$ indicating a timing advance value determined as roundtrip delay to the terminal apparatus, the coefficient a indicating a system configuration parameter value determined based on a period of time after transmitting data to the terminal apparatus until receiving data from the terminal apparatus.

19. A method comprising:
performing wireless communication; and
performing, by a processor, control such that information indicating a first processing time that is decided in accordance with a terminal apparatus for deciding a minimum unit of a transmission time in communication via the wireless communication is transmitted to a base station via the wireless communication, the first processing time being a time from completion of data reception to start of data transmission at the terminal apparatus,
wherein the minimum unit of the transmission time is determined as sTTI according to a following condition;

$$T_{UE}+T_{ADV}<a*\text{sTTI}$$

wherein, the condition is satisfied on a basis of a predetermined coefficient a in a case in which the first processing time is defined as $T_{UE}$, the $T_{UE}$ indicating a time for decoding of received data and generation of transmission data at the terminal apparatus, the $T_{ADV}$ indicating a timing advance value determined as roundtrip delay between the base station and the terminal apparatus, the coefficient a indicating a system configuration parameter value determined based on a period of time after the apparatus transmits data to the terminal apparatus until the base station receives data from the terminal apparatus.

* * * * *